(12) United States Patent
Penilla et al.

(10) Patent No.: US 9,581,997 B1
(45) Date of Patent: Feb. 28, 2017

(54) METHOD AND SYSTEM FOR CLOUD-BASED COMMUNICATION FOR AUTOMATIC DRIVERLESS MOVEMENT

(71) Applicants: Angel A. Penilla, Sacramento, CA (US); Albert S. Penilla, Sunnyvale, CA (US)

(72) Inventors: Angel A. Penilla, Sacramento, CA (US); Albert S. Penilla, Sunnyvale, CA (US)

(*) Notice: Subject to any disclaimer, the term of this patent is extended or adjusted under 35 U.S.C. 154(b) by 282 days.

(21) Appl. No.: 13/934,215

(22) Filed: Jul. 2, 2013

Related U.S. Application Data

(63) Continuation-in-part of application No. 13/452,882, filed on Apr. 22, 2012, now Pat. No. 9,123,035.

(60) Provisional application No. 61/760,003, filed on Feb. 1, 2013, provisional application No. 61/745,729, filed on Dec. 24, 2012, provisional application No. 61/478,436, filed on Apr. 22, 2011, provisional application No. 61/757,020, filed on Jan. 25, 2013.

(51) Int. Cl.
*H02J 3/32* (2006.01)
*G05D 1/00* (2006.01)
*G08G 1/16* (2006.01)

(52) U.S. Cl.
CPC ........... *G05D 1/0011* (2013.01); *G08G 1/161* (2013.01)

(58) Field of Classification Search
CPC ........................................................ H02J 3/32
USPC ......................................................... 320/155
See application file for complete search history.

(56) References Cited

U.S. PATENT DOCUMENTS

| | | | |
|---|---|---|---|
| 3,690,397 A | 9/1972 | Parker |
| 3,799,063 A | 3/1974 | Reed |
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |

(Continued)

*Primary Examiner* — Thuan Do

(57) ABSTRACT

Methods, computer systems, and servers are provided for navigating a vehicle automatically from a current location to a destination location with or without a human operator controlling primary navigation of the vehicle. One example method includes identifying a vehicle location and determining if the vehicle location is near a self-park location. The method accesses mapping data for the self-park location and receiving a request to initiate a self-park process for the vehicle. The method includes forwarding instructions to the vehicle to proceed with the self-park process. The self-park process acting to control the vehicle to automatically move from a current location to a destination location in the self-park location, and the current location and the destination location are updated dynamically as the current location of the vehicle changes and based on conditions of the destination location. Vehicles can be dropped off, registered for self-parking via a smartphone, and the vehicle moves to an available parking location.

8 Claims, 20 Drawing Sheets

(56) References Cited

U.S. PATENT DOCUMENTS

| | | | |
|---|---|---|---|
| 4,789,047 A | 12/1988 | Knobloch | |
| 4,815,840 A | 3/1989 | Benayad-Cherif et al. | |
| 5,049,802 A | 9/1991 | Mintus et al. | |
| 5,121,112 A | 6/1992 | Nakadozono | |
| 5,132,666 A | 7/1992 | Fahs | |
| 5,184,058 A | 2/1993 | Hesse | |
| 5,202,617 A | 4/1993 | Nor | |
| 5,297,664 A | 3/1994 | Tseng et al. | |
| 5,306,999 A | 4/1994 | Hoffman | |
| 5,315,227 A | 5/1994 | Pierson | |
| 5,327,066 A | 7/1994 | Smith | |
| 5,343,970 A | 9/1994 | Severinsky | |
| 5,422,624 A | 6/1995 | Smith | |
| 5,434,781 A | 7/1995 | Alofs | |
| 5,441,122 A | 8/1995 | Yoshida | |
| 5,449,995 A | 9/1995 | Kohchi | |
| 5,487,002 A | 1/1996 | Diler et al. | |
| 5,488,283 A | 1/1996 | Doughert et al. | |
| 5,492,190 A | 2/1996 | Yoshida | |
| 5,548,200 A | 8/1996 | Nor et al. | |
| 5,549,443 A | 8/1996 | Hammerslag | |
| 5,555,502 A | 9/1996 | Opel | |
| 5,563,491 A | 10/1996 | Tseng | |
| 5,585,205 A | 12/1996 | Kohchi | |
| 5,594,318 A | 1/1997 | Knor | |
| 5,595,271 A | 1/1997 | Tseng | |
| 5,596,258 A | 1/1997 | Kimura et al. | |
| 5,612,606 A | 3/1997 | Guimarin et al. | |
| 5,627,752 A | 5/1997 | Buck et al. | |
| 5,636,145 A | 6/1997 | Gorman et al. | |
| 5,642,270 A | 6/1997 | Green et al. | |
| 5,666,102 A | 9/1997 | Lahiff | |
| 5,691,695 A | 11/1997 | Lahiff | |
| 5,694,019 A | 12/1997 | Uchida et al. | |
| 5,701,706 A | 12/1997 | Kreysler et al. | |
| 5,736,833 A | 4/1998 | Farris | |
| 5,760,569 A | 6/1998 | Chase, Jr. | |
| 5,778,326 A | 7/1998 | Moroto et al. | |
| 5,790,976 A | 8/1998 | Boll et al. | |
| 5,892,598 A | 4/1999 | Asakawa et al. | |
| 5,916,285 A | 6/1999 | Alofs et al. | |
| 5,974,136 A | 10/1999 | Murai | |
| 5,998,963 A | 12/1999 | Aarseth | |
| 6,014,597 A | 1/2000 | Kochanneck | |
| 6,049,745 A | 4/2000 | Douglas et al. | |
| 6,067,008 A | 5/2000 | Smith | |
| 6,081,205 A | 6/2000 | Williams | |
| 6,085,131 A | 7/2000 | Kim | |
| 6,151,539 A | 11/2000 | Bergholz et al. | |
| 6,175,789 B1 | 1/2001 | Beckert et al. | |
| 6,225,776 B1 | 5/2001 | Chai | |
| 6,234,932 B1 | 5/2001 | Kuroda et al. | |
| 6,236,333 B1 | 5/2001 | King | |
| 6,252,380 B1 | 6/2001 | Koenck | |
| 6,275,231 B1 * | 8/2001 | Obradovich | 345/156 |
| 6,301,531 B1 | 10/2001 | Pierro | |
| 6,307,349 B1 | 10/2001 | Koenck et al. | |
| 6,330,497 B1 | 12/2001 | Obradovich et al. | |
| 6,330,499 B1 | 12/2001 | Chou et al. | |
| 6,370,475 B1 | 4/2002 | Breed et al. | |
| 6,373,380 B1 | 4/2002 | Robertson et al. | |
| 6,416,209 B1 | 7/2002 | Abbott | |
| 6,434,465 B2 | 8/2002 | Schmitt et al. | |
| 6,456,041 B1 | 9/2002 | Terada et al. | |
| 6,466,658 B2 | 10/2002 | Schelberg, Jr. et al. | |
| 6,480,767 B2 | 11/2002 | Yamaguchi | |
| 6,487,477 B1 | 11/2002 | Woestmanm et al. | |
| 6,498,454 B1 | 12/2002 | Pinlam | |
| 6,511,192 B1 | 1/2003 | Henion | |
| 6,586,866 B1 | 7/2003 | Ikedo | |
| 6,614,204 B2 | 9/2003 | Pellegrino et al. | |
| 6,629,024 B2 | 9/2003 | Tabata | |
| 6,703,944 B1 * | 3/2004 | Obradovich | 340/903 |
| 6,727,809 B1 | 4/2004 | Smith | |
| 6,741,036 B1 | 5/2004 | Ikedo | |
| 6,765,495 B1 | 7/2004 | Dunning et al. | |
| 6,789,733 B2 | 9/2004 | Terranova | |
| 6,794,849 B2 | 9/2004 | Mori et al. | |
| 6,850,898 B1 | 2/2005 | Murakami | |
| 6,915,869 B2 | 7/2005 | Botti | |
| 6,922,629 B2 | 7/2005 | Yoshikawa et al. | |
| 6,937,140 B1 | 8/2005 | Outslay | |
| 6,940,254 B2 | 9/2005 | Nagamine | |
| 7,013,205 B1 | 3/2006 | Hafner | |
| 7,039,389 B2 | 5/2006 | Johnson, Jr. | |
| 7,084,781 B2 | 8/2006 | Chuey | |
| 7,102,496 B1 * | 9/2006 | Ernst et al. | 340/436 |
| 7,124,027 B1 * | 10/2006 | Ernst et al. | 701/301 |
| 7,201,384 B2 | 4/2007 | Chaney | |
| 7,269,416 B2 | 9/2007 | Guthrie et al. | |
| 7,289,611 B2 | 10/2007 | Iggulden | |
| 7,376,497 B2 | 5/2008 | Chen | |
| 7,379,541 B2 | 5/2008 | Iggulden et al. | |
| 7,402,978 B2 | 7/2008 | Pryor | |
| 7,532,965 B2 | 5/2009 | Robillard | |
| 7,565,396 B2 | 7/2009 | Hoshina | |
| 7,630,802 B2 | 12/2009 | Breed | |
| 7,650,210 B2 | 1/2010 | Breed | |
| 7,674,536 B2 | 3/2010 | Chipchase | |
| 7,683,771 B1 | 3/2010 | Loeb | |
| 7,693,609 B2 | 4/2010 | Kressner et al. | |
| 7,698,078 B2 | 4/2010 | Kelty et al. | |
| 7,740,092 B2 | 6/2010 | Bender | |
| 7,751,945 B2 | 7/2010 | Obata | |
| 7,778,746 B2 | 8/2010 | McLeod | |
| 7,796,052 B2 | 9/2010 | Katz | |
| 7,850,351 B2 | 12/2010 | Pastrick et al. | |
| 7,869,576 B1 | 1/2011 | Rodkey et al. | |
| 7,885,893 B2 | 2/2011 | Alexander | |
| 7,949,435 B2 | 5/2011 | Pollack | |
| 7,956,570 B2 | 6/2011 | Lowenthal | |
| 7,979,198 B1 | 7/2011 | Kim et al. | |
| 7,986,126 B1 | 7/2011 | Bucci | |
| 7,991,665 B2 | 8/2011 | Hafner | |
| 8,006,793 B2 | 8/2011 | Heichal et al. | |
| 8,027,843 B2 | 9/2011 | Bodin et al. | |
| 8,036,788 B2 | 10/2011 | Breed | |
| 8,054,048 B2 | 11/2011 | Woody | |
| 8,072,318 B2 | 12/2011 | Lynam | |
| 8,103,391 B2 | 1/2012 | Ferro et al. | |
| 8,256,553 B2 | 9/2012 | De Paschoal | |
| 8,262,268 B2 | 9/2012 | Pastrick et al. | |
| 8,265,816 B1 | 9/2012 | LaFrance | |
| 8,266,075 B2 | 9/2012 | Ambrosio et al. | |
| 8,294,420 B2 | 10/2012 | Kocher | |
| 8,333,492 B2 | 12/2012 | Dingman et al. | |
| 8,336,664 B2 | 12/2012 | Wallace et al. | |
| 8,350,526 B2 | 1/2013 | Dyer et al. | |
| 8,366,371 B2 | 2/2013 | Maniscalco et al. | |
| 8,392,065 B2 | 3/2013 | Tolstedt | |
| 8,405,347 B2 | 3/2013 | Gale | |
| 8,482,255 B2 | 7/2013 | Crombez | |
| 8,483,775 B2 | 7/2013 | Buck et al. | |
| 8,483,907 B2 | 7/2013 | Tarte | |
| 8,490,005 B2 | 7/2013 | Tarte | |
| 8,508,188 B2 | 8/2013 | Murtha et al. | |
| 8,521,599 B2 | 8/2013 | Rivers, Jr. et al. | |
| 8,527,135 B2 | 9/2013 | Lowrey et al. | |
| 8,527,146 B1 | 9/2013 | Jackson | |
| 8,552,686 B2 | 10/2013 | Jung | |
| 8,589,019 B2 | 11/2013 | Wallace et al. | |
| 8,624,719 B2 | 1/2014 | Klose | |
| 8,630,741 B1 | 1/2014 | Matsuoka et al. | |
| 8,635,091 B2 | 1/2014 | Amigo | |
| 8,643,329 B2 | 2/2014 | Prosser et al. | |
| 8,660,734 B2 | 2/2014 | Zhu et al. | |
| 8,686,864 B2 | 4/2014 | Hannon | |
| 8,694,328 B1 | 4/2014 | Gormley | |
| 8,706,394 B2 | 4/2014 | Trepagnier et al. | |
| 8,713,121 B1 | 4/2014 | Bain | |
| 8,717,170 B1 | 5/2014 | Juhasz | |
| 8,725,551 B2 | 5/2014 | Ambrosio et al. | |
| 8,751,065 B1 | 6/2014 | Kato | |
| 8,751,271 B2 | 6/2014 | Stefik et al. | |

(56) References Cited

U.S. PATENT DOCUMENTS

| | | |
|---|---|---|
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 8,990,016 B2 * | 3/2015 | Kashalkar ............... 701/533 |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2002/0198632 A1 * | 12/2002 | Breed et al. ............. 701/1 |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Kawai et al. |
| 2004/0056779 A1 * | 3/2004 | Rast ................ B63B 22/16 340/985 |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0253226 A1 * | 11/2006 | Mendelson ............... 701/1 |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0193798 A1 * | 8/2007 | Allard et al. ............ 180/169 |
| 2007/0282495 A1 | 12/2007 | Kempton |
| 2008/0027640 A1 * | 1/2008 | Kashalkar ............... 701/209 |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim et al. |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichal et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032170 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Tucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0124006 A1 * | 5/2013 | Anantha et al. .......... 701/1 |
| 2013/0127247 A1 | 5/2013 | Oh et al. |
| 2013/0135093 A1 | 5/2013 | Araki |
| 2013/0144520 A1 | 6/2013 | Ricci |

(56) References Cited

U.S. PATENT DOCUMENTS

| | | |
|---|---|---|
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

\* cited by examiner

Sensor (on – boundary set to 10x15 feet virtual parking spot boundary deployed)

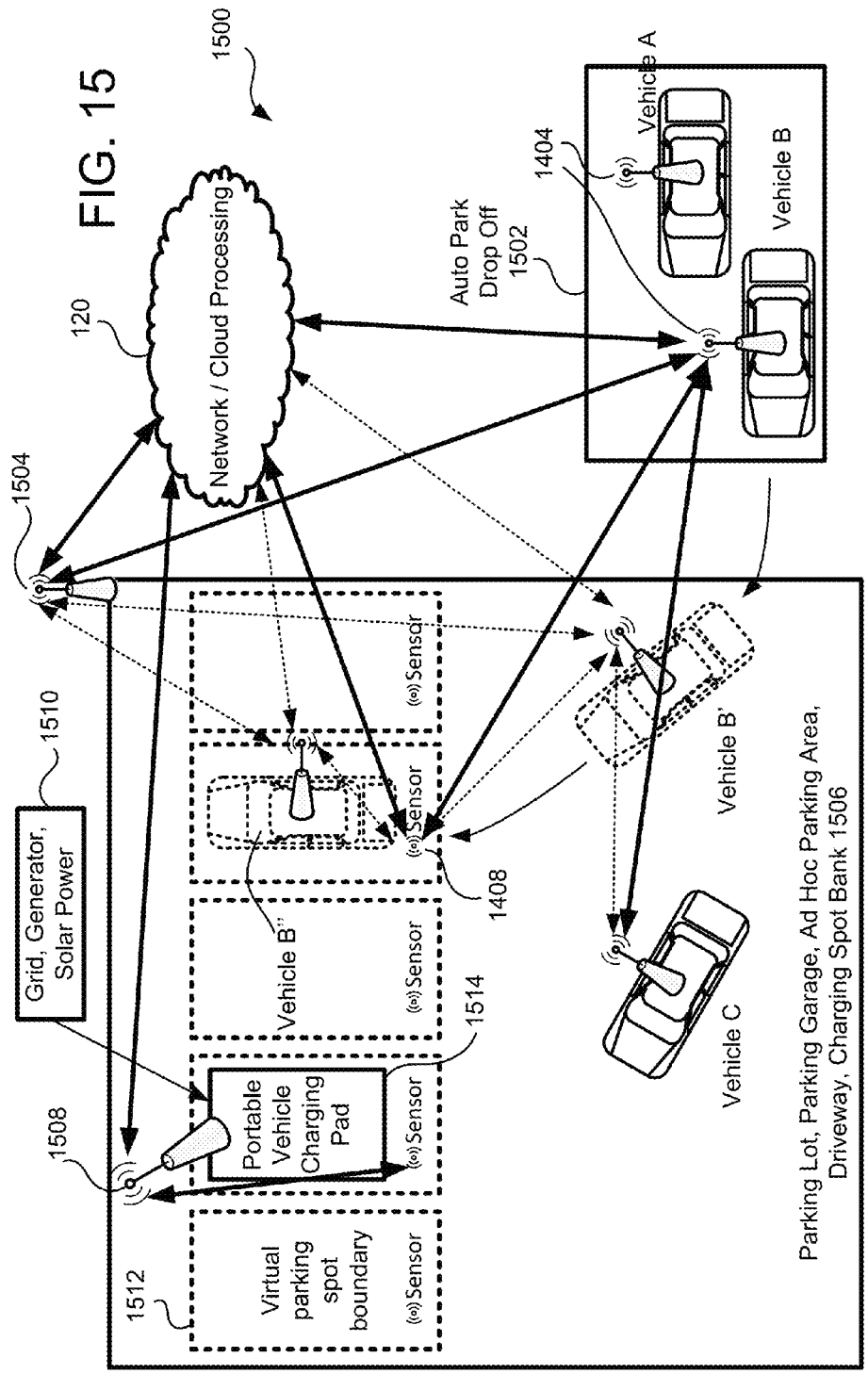

METHOD AND SYSTEM FOR CLOUD-BASED COMMUNICATION FOR AUTOMATIC DRIVERLESS MOVEMENT

CLAIM OF PRIORITY

The present application claims priority from U.S. Provisional Patent Application No. 61/757,020, filed on Jan. 25, 2013, and entitled "Methods and Systems for Cloud-Based Data Exchanges For Remote Vehicle Control and Data Sharing, Communication for Automatic Driverless Movement, Accident Avoidance Control and Notifications," which is herein incorporated by reference.

The present application claims priority from U.S. Provisional Patent Application No. 61/760,003, filed on Feb. 1, 2013, and entitled "METHODS AND SYSTEMS FOR VEHICLE SECURITY AND REMOTE ACCESS AND SAFETY CONTROL INTERFACES AND NOTIFICATIONS", which is herein incorporated by reference.

The present invention claims priority to U.S. Provisional Patent Application No. 61/745,729, filed on Dec. 24, 2012, and entitled "METHODS AND SYSTEMS FOR ELECTRIC VEHICLE (EV) CHARGING, CHARGING SYSTEMS, INTERNET APPLICATIONS AND USER NOTIFICATIONS", which is herein incorporated by reference.

This Application is also a continuation-in-part of U.S. application Ser. No. 13/452,882, filed Apr. 22, 2012, and entitled "ELECTRIC VEHICLE (EV) RANGE EXTENDING CHARGE SYSTEMS, DISTRIBUTED NETWORKS OF CHARGE KIOSKS, AND CHARGE LOCATING MOBILE APPS", which claims priority to U.S. Provisional Application No. 61/478,436, filed on Apr. 22, 2011.

All above identified applications are incorporated herein by reference.

FIELD OF THE EMBODIMENTS

The present invention relates to systems and methods that enable vehicles, structures and objects to exchange information with cloud-based processing systems and each other.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to the level that "self-driving" vehicles have been discussed and researched. However, such research has not yielded any type of commercial implementation that would enable the reliable use of self-driving vehicles in society.

It is in this context that embodiments of the invention arise.

SUMMARY

Embodiments are described regarding self-driving vehicles and partially self-driving vehicles. The embodiments are also applicable to driver occupied vehicles, which include automation for parking, moving, collision avoidance, parking locators, parking or charge reservation systems, notifications systems, and method and systems that provide cloud services.

In one embodiment, a method for navigating a vehicle automatically from a current location to a destination location with or without a human operator is provided. The method includes receiving a vehicle location, determining if the vehicle location is near a self-park location, and determining if the vehicle is proximate the self-park location for a threshold period of time that is indicative of the vehicle desiring to enter the self-park location. The method includes accessing mapping data for the self-park location and receiving a request to initiate a self-park process for the vehicle. The method also includes instructing the vehicle to proceed with the self-park process. The self-park process acting to enable the vehicle to automatically move from a current location to a destination location within the self-park location. The current location and the destination location are updated dynamically as the current location of the vehicle changes and based on conditions of the destination location.

In some embodiment, the self-parking location includes a plurality of sensors, each of the sensors being associated to physical locations in the self-parking location, and selected ones of the sensors monitoring a volume of space to detect changes.

In some embodiment, the changes in the volume space include presence or lack of presence of objects over time.

In some embodiment, the objects present in the volume space include one of humans, pets, vehicles, or objects determined to be other than free space for the vehicle to move, park or traverse.

In some embodiment, the sensors of the self-parking location include sensors of one or more vehicles located in the self-parking location.

In one embodiment, a method for providing collision avoidance feedback to vehicles is provided. Electronics are incorporated in a first vehicle that receives input from at least one sensor of the first vehicle and electronics that are incorporated in a second vehicle receive input from at least one sensor of the second vehicle. The method includes detecting proximity separation between the first and second vehicle, wherein when at least one of the sensors of the first vehicle or the second vehicle determine that the proximity separation is less than a threshold distance, a pairing algorithm is triggered between the electronics of the first and second vehicle to enable direct communication for data exchange between the first and second vehicles. The method also includes triggering a warning to one or both of the first and second vehicles if the data exchange determines that a probability exists that a current heading of the first or second vehicles will result in a collision between the first and second vehicles. The method then initiates a corrective action by one or both of the first or second vehicles if the data exchange between the first and second vehicles increase the probability that the current heading will result in a collision between the first and second vehicles.

In some embodiment, the warning is supplied to either the first or second vehicles in an output form to alert a human occupant in the vehicles.

In some embodiment, the warning includes one of a sound warning, an audio spoken sound, tactile feedback to a component of the vehicle, light signals within the vehicle, or a combination of one or more thereof.

In some embodiment, the corrective action includes application of breaks, application of auto-turning a steering while, a switch to auto-drive mode, acceleration, acceleration and deceleration, or combinations of one or more thereof.

In some embodiment, detecting proximity separation includes detecting moving objects, the moving objects include the first and second vehicles or the vehicles and a non-vehicle physical object.

In some embodiment, the pairing algorithm enables short form communication, the communication includes a peer-to-peer communication, Wi-Fi communication, NFC communication, or Bluetooth communication, or wireless communication.

Some embodiment further include storing a history event log of occurrences and actions taken when triggering a warning or taking corrective action, the history event log being communicated over the Internet to cloud processing systems for remote storage and remote access.

Some embodiment further include, triggering recording of audio and video surrounding the first or second vehicle when it is determined that the probability exists that the current heading of the first or second vehicles will result in the collision; and transmitting the recording over the Internet to cloud processing systems for remote storage and remote access.

In some embodiments, a notification regarding the recording is forwarded to one or more predetermined recipients, to an account of a user, to an account of a rental car company, to an account of a service provider, wherein the notification is one of an email, a text message, a social network message, a phone call, an audio alert, an audio/visual alert.

In some embodiment, the notification includes a clip of the recording or access to the recording on the remote storage via access to an account user name and password.

In some embodiment, the notification is sent to an insurance broker if its determined that a collision actually occurred, or enables user permissions for sending to the insurance broker or third party.

In some embodiment, the notification for when a collision actually occurs includes data regarding a heading, or speed, or weather conditions, or video clips, or license plate images, or person identification data, or combinations thereof.

In one embodiment, a method for navigating a vehicle automatically from a current location to a destination location with or without a human operator controlling primary navigation of the vehicle is provided. The method includes identifying a vehicle location and determining if the vehicle location is near a self-park location. The method accesses mapping data for the self-park location and receiving a request to initiate a self-park process for the vehicle. The method includes forwarding instructions to the vehicle to proceed with the self-park process. The self-park process acting to control the vehicle to automatically move from a current location to a destination location in the self-park location, and the current location and the destination location are updated dynamically as the current location of the vehicle changes and based on conditions of the destination location. In one example, the self-parking location includes a plurality of sensors, each of the sensors being associated to physical locations in the self-parking location, and selected ones of the sensors monitoring a volume or area of the space to detect changes and avoid collisions, and the sensors identifying when particular parking spots in the self-parking location are available for use, and the availability for use is updated from time to time as parking spots are become occupied or become available. Global positioning satellite (GPS) data is used to manage control of the vehicle before, during and after instructing the vehicle to automatically move and the vehicle uses hardware and software on-board the vehicle and data obtained from client services data to manage at least part of the automatic movement of the vehicle. The method is executed by a processor. In one example, the method is executed by a server. The server may be one or more servers distributed over the internet, and can include load processing. Vehicles can be dropped off, registered for self-parking via a smartphone, and the vehicle moves to an available parking location.

In some embodiment, the self-park location is one of a parking garage, a parking lot, a private property area, a garage and drive-way, a private resistance, a public location, or a combination of private and public spaces.

In some embodiment, instructing the vehicle to proceed with the self-park process is initiated via a remote computing device, and the remote computing device is a computing device that is either portable or not portable and the computing device has access to the Internet to communicate with cloud services, the cloud services including an account for users to register their vehicles and access historical data and set control data for the registered vehicles.

DRAWINGS

FIGS. 14-16C illustrate examples of communication between cloud processing, locations and vehicles, in accordance with some embodiments.

DETAILED EMBODIMENTS

Figure 1:
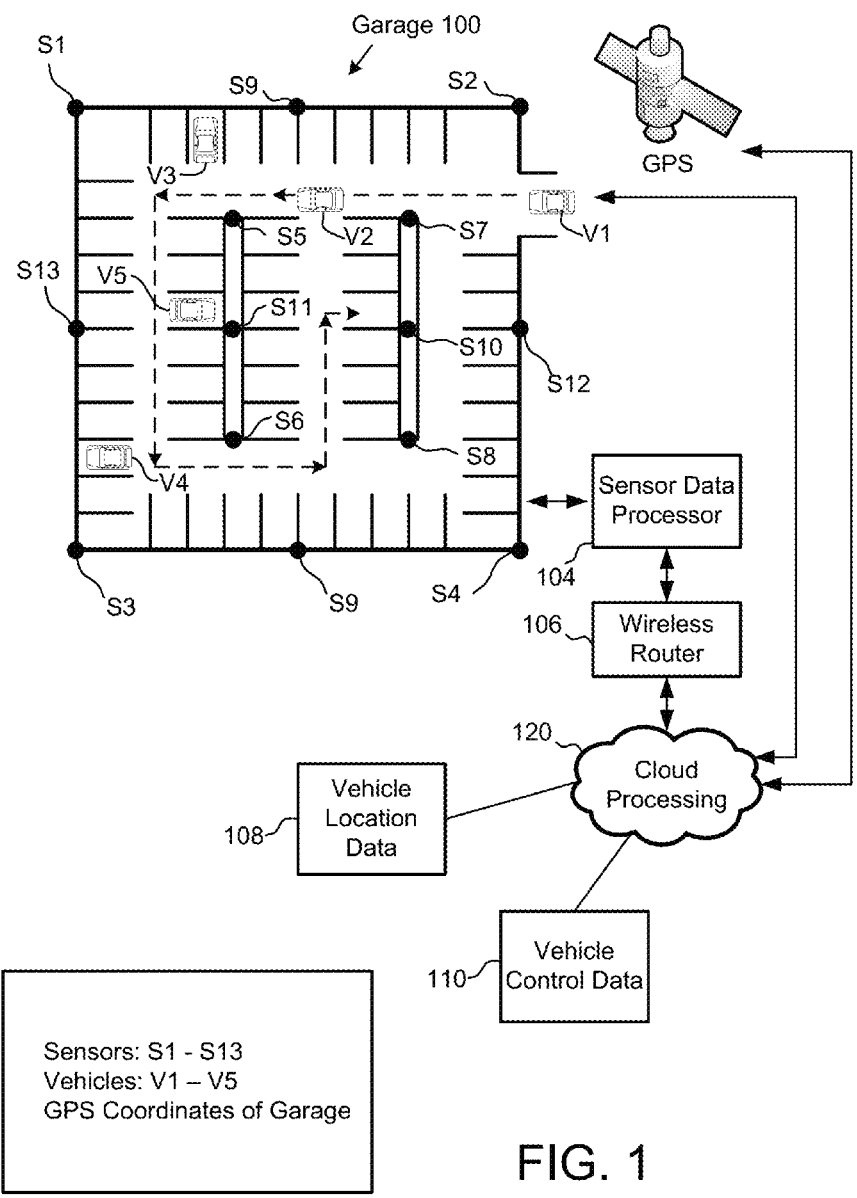
FIGS. 1 and 2 show examples of a garage where automated parking can occur or a vehicle and communications with cloud processing, in accordance with some embodiments.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles. In some embodiment, vehicles can be fully driverless or the vehicle can operation partially driverless. The term driverless should be understood to include cases where a driver is in the driver's seat, yet, some action by the car is taken place without the person's direct control. In other cases, the vehicle can be unoccupied, and if the vehicle is made to move automatically, this can also qualify as a driverless action, function, operation or action.

In one embodiment, structures described herein can include parking structures, parking lots, private or commercial buildings, a drive-through, bridges, toll roads, highways, shared or home driveways, designated driving and parking areas. In the specific embodiments described herein, vehicles, structures and objects will include circuitry and communication logic to enable communication with a cloud processing system over the Internet. A cloud processing system, as described herein, will include systems that are operated and connected to the Internet or to each other using local networking communication protocols.

A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scan, finger print, or via a touchscreen contained or displayed within the vehicle.

In other embodiments, the electronics of a vehicle can synchronize with a user's portable electronics. The user's electronics can include, for example mobile devices that include smart phones, tablet computers, laptop computers, general-purpose computers, special purpose computers, gaming consoles, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle. In the following embodiments, examples will be provided for ways of having the cloud processing services deliver processing information concerning various physical locations that have mapping data associated there with. The following embodiments will also provide examples of ways a cloud processing service, together with physical sensors, can allow vehicles, structures and objects to become aware of each other, share locations, measurements and mapping data, intended paths and other metrics along with remote administration of the same.

The mapping data associated with the various locations can include locations of objects in the real world. The objects in the real world can include roads, sidewalks, buildings, barriers, fencing, parking structures, walls or obstacles within a location, doors, positioning of walls, location information of other vehicles within a location, sensor data associated with various locations, mapping data that outlines the geometries of a building or vehicle, sensor location that is static and/or dynamic, area and volume information within buildings, structures or areas, sensors for detecting movement or presence of obstacles within a location, data identifying occupancy a specific locations such as parking structure parking spaces, etc. In one embodiment, vehicles can be fully driverless or the vehicle can operation partially driverless. For instance, a partially driverless car is one that may still have a driver or occupant in a position to control/navigate the vehicle (e.g., in the driver's seat), but some movement or control will be carried out by the automation of the vehicle. In an example of a parking operation, the driver may remain in the vehicle during some or part of the driverless actions of the vehicle, and the driver can (if needed) interrupt (e.g., override) the actions automated actions of the vehicle. It should therefore be understood that any mention of driverless vehicles or actions can, in some embodiments, still include a person within the vehicle (whether in full or partial control of the vehicle).

In one embodiment, the sensors of the building, showing the outline of the building can provide data of what spaces are available within a designated parking area for example. When a vehicle reaches a building, parking lot, parking designated area of ad-hoc parking lot where auto-park is available, the vehicle will become aware of the availability of non-human operated auto parking and will transfer and receive information to and from the cloud to download and/or access the building's location and map of sensors. When a vehicle reaches a different auto-park location, it will download that particular map. The map will only be downloaded or accessed when it is determined that the vehicle desires to enter the parking structure either by crossing a proximity threshold of by election of the vehicle's operator. Thus, a threshold of time or proximity can be determined before the car gets the mapping information for the given location. For example, if a vehicle is parked near the entrance of a parking structure (determined automatically by the GPS of a vehicle and the GPS of parking structure), this proximity produces a type of optional "paring" with the garage location which a vehicle operator can elect to enter using a physical or remote cloud connected interface to select an outcome.

In one embodiment, vehicles can maintain valuable information regarding where they are, where they are heading and their destination maintained which is maintained by GPS and navigation systems on board. The information collected and maintained by every vehicle is mutually exclusive, meaning that only each individual vehicle is aware of its own heading, rate of speed and current location. This information, on one embodiment is crowd sourced and crowd shared/consumed for use in for accident avoidance. By networking vehicles within a certain radius together, all individually location-aware vehicles become also aware of all other vehicles in their sphere of influence. Every vehicle will network with vehicles in their range using wireless communication systems such as but not limited to Wi-Fi, Wi-Gig LTE, cellular, radio, near field communication or other methods.

In one embodiment, each vehicle will maintain a table of all other vehicles in, entering, and or leaving its sphere of influence. In some embodiments, all or some of the vehicle will maintain and continuously share its own heading, speed and location. In one embodiment, an algorithm on each vehicle will continuously compare the current vehicle's speed, heading and location with that of all other vehicles in its sphere of influence to determine if a collision may result.

A vehicle collision is not a single event; it is the intersection that happens between two vehicles having intended paths, headings, and speeds that perfectly collide at some point in the future if course correction is not taken. Thus, an algorithm may be able to predict the probability of a future collision where a human may not and alert the driver to alter heading and/or speed. The system will have the ability to enact passive and active accident avoidance vehicle maneuvers in proactive action to an imminent collision.

The system may alert the drivers to change their rate of speed, heading, or location. The system may give each of the two drivers custom messages such as telling both drivers to veer right so they don't steer into each other. The vehicle may also automatically provide audio and or visual alerts such as honking the horn or flashing headlights to alert the other driver. Active accident avoidance may engage if certain collision is immanent within a certain threshold such as within the next 50 ft for example. In this case, both vehicles, being aware of each other, will engage in an automatic and complementary accident avoidance maneuver such as slowing down, steering away from impact and or both. The vehicle may engage secondary methods of identifying imminent collision such as radar, sonar, infrared or other secondary object identification method to ensure the predicted collision is not a false alarm.

The vehicle's cameras can be engaged to take still photos and or video record any incident, whether it results in a successful avoidance or impact. This footage can be used to alert authorities of the severity of the accident and aid insurance companies in identifying fault. A vehicle will maintain a buffer of events for a given amount of time before and after a collision event or collision avoidance event such as the location, speed, heading, and avoidance measures to store and identify the metrics that lead to an incident.

This system described above can be used not only between two vehicles for the purpose of accident or collision avoidance, but can also be used between a vehicle and an object, a vehicle and a moving object, a vehicle and a structure as well as a combination of vehicles, objects and structures. The methods for accident avoidance between two vehicles can be extended for use in automated vehicle maneuvering. This maneuvering includes but is not limited to negotiating obstacles, structures, parking lots, drive ways, toll roads, highways, drive-thru, etc. These obstacles, can be physical or virtual where a vehicle might interpret a virtual boundary of an object or parking spot for instance as being real and thus having to maneuver in, on or around it for the purposes of collision avoidance, parking or automated vehicle storage.

Vehicle storage can be automated at physical static locations or can be deployed manually in an ad-hoc manner with the use of portable sensors that emit a signal to network connected devices, vehicles, objects and structures transmitting metrics and dimensions the sensor is virtualizing at that given moment. For instance, a sensor can be set up to communicate with a vehicle that it represents a parking spot. This parking spot can transmit information about it such as what type or spot it is, its dimensions, its availability, if it has a charging station incorporated into it, scheduling, availability as well as on the fly booking of the spot for parking time, charging time etc. either remotely or within a proximity threshold by a user in or around their vehicle or remotely.

FIG. 1 illustrates an example of a location, such as garage 100 having a plurality of sensors S1 through S12. The sensors are located in various locations within the garage 100. The sensors provide mapping information of the physical structures within the garage 100. This mapping information provided by the garage 100 (or cloud system database of the garage 100) can be transmitted to vehicles that will then be allowed to traverse the garage 100. The vehicle will also now be informed of the specific locations of the objects within the garage 100 or of the garage 100 itself to dynamically and actively avoid collision with the structure's physical obstructions. As shown, the garage 100 will also be in communication with a global positioning system (GPS) 102, which assigns garage 100 GPS a location as well as a set of locations which can be used in mapping outlines of the structure. The GPS locations can be assigned to the garage 100, or to various locations within the garage. For example, GPS coordinates can be assigned to each of the sensors S1-S12 of garage 100 or to the entire structure itself. In one embodiment, the GPS coordinates of each of the sensors may be approximated, due to a potential offset of the sensor's actual GPS coordinates due to interference, weather, malfunction etc. This offset can be calibrated for each of the sensors, such that the actual location of the sensors can be associated or dynamically corrected for the GPS coordinates assigned to each of the sensors.

In one embodiment every time a vehicle receives coordinates to the location of a certain sensor, the vehicle will travers towards that sensor and verify through the use of ad-hoc networking, sonar, infrared, radar or other method that the location given to the vehicle of the sensor matches its physical location. If the actual physical location of the sensor does not match the coordinates furnished to the vehicle, the vehicle will report back to the cloud processing system in order to correct the coordinates for transmission to the next auto-traversing vehicle. This will provide a vehicles traversing within garage 100 with more accurate identification and location of obstacles within garage 100. Without correcting the GPS coordinates, it is possible that a vehicle will come into in appropriate contact with an object within garage 100. In other embodiments, each of the sensors S1-S12 will be calibrated to a GPS location, and the calibration can also be assigned to the GPS location of the vehicle traversing within or here or approaching garage 100.

In the example shown, a vehicle v1 is shown entering garage 100, and another vehicle v2 is shown driving along a path to a desired or assigned parking location. As shown, other vehicles v3-v4 may already be located within garage 100. In one embodiment, each of the vehicles will also have sensors that will alert the cloud processing of their location when another vehicle or object approaches that particular vehicle. Thus, the movement of vehicle v2 and the location of vehicles v3-v5 will be known to the cloud processing system and all vehicles (or those enabled for communication) within the given range will also be aware of each other. As such, the system uses a combination of sensors located in garage 100 as well as sensors located on vehicles themselves to aid vehicles in traversing the garage 100 or maneuvering around obstacles as well as vehicles already stationed or moving about garage 100. In one embodiment, each of the vehicles within garage 100, whether the vehicle is turned on or turned off, will still be able to provide location and or sensor data to the cloud processing system 120. Sensors within garage 100 can also include information concerning the volume or areas of individual parking designated physical or virtual spots within garage 100. This additional sensor data can be transferred to a sensor data processor 104 of garage 100. Sensor data processor 104 can communicate that information to cloud processing 120 via a wireless router 106, or other suitable wired or wireless communication system that allows connection between garage 100 and the Internet.

As shown, vehicle location data 108 of each of the vehicles, structures or objects that are proximate the garage 100 can communicate their location data to cloud processing 120 so that information concerning the garage 100. Sensors that are fixed as well as sensors within garage 100 can locate- or identify moving objects which can be communicated to the cloud processing system along with data of the vehicle location data 108. Vehicle control data 110 can also be provided to cloud processing 120. Vehicle control data can include information that is provided to a specific vehicle to directing that vehicle to park. For example, if garage 100 enables automatic vehicle parking, such as parking operations that do not involve the human to drive the vehicle, that vehicle can be provided with vehicle control data 110. Vehicle control data 110 can be provided via cloud processing 120 to any specific vehicle.

Information provided to a specific vehicle can include, for example, an operator of the garage 100 enabling a user to select or identify a desired parking location for the vehicle in garage 100. In one embodiment, a user may approach garage 100 and desires to park his or her vehicle in garage 100. At the entrance of garage 100, the user can identify a parking space for the vehicle and then exit the vehicle. The vehicle is then automatically moved to the desired or specific parking spot identified either by the vehicle's user or by a garage 100 operator. In one embodiment, the a vehicle user approaches the garage 100 while operating the vehicle. When the vehicle's GPS detects that the vehicle may be in proximity to garage 100, mapping data associated with garage 100 is downloaded or made accessible to the vehicle's electronics. The vehicle's electronics will become aware of the mapping data for garage 100. The vehicle's user may then choose to program the vehicle to automatically park using a graphical user display in the vehicle. Similarly, the user may elect to program the vehicle to automatically park using a smart network connected device (smart phone, tablet, computer, etc.). Once programmed by the vehicle user, the vehicle can proceed to automatically move to the desired parking spot or a parking spot that the garage 100 designates for that vehicle.

For example, the user may wish to have the car parked in a VIP area of garage 100. If the vehicle's owner selects the VIP area, or is granted access to VIP areas, the vehicle may be parked in a more convenient location within garage 100. The parking slots in garage 100 can be monitored with sensors to identify which parking spots are available. When the user provides a parking location preference election at the entrance of garage 100, the vehicle will proceed to park in garage 100 at the desired location automatically. In one embodiment, garage 100 may have a plurality of floors or levels. The vehicle can now traverse automatically to a specific floor and find the parking spot at which the vehicle will be stationed.

Since a multi-floor or multi-level parking garage has a height, simple LAT, LONG GPS coordinates alone cannot aid the vehicle in traversing vertically to the desired floor. Thus, the aid of additional sensors in conjunction with GPS can aid the vehicle in negotiating the parking garage's obstructions, levels, and parking slot locations. This information can be obtained by rules or databases provided by garage 100 to the vehicle, and the direction or vehicle control data 110 can be provided by the user of the vehicle who desires to have the vehicle parked in garage 100.

Figure 2:
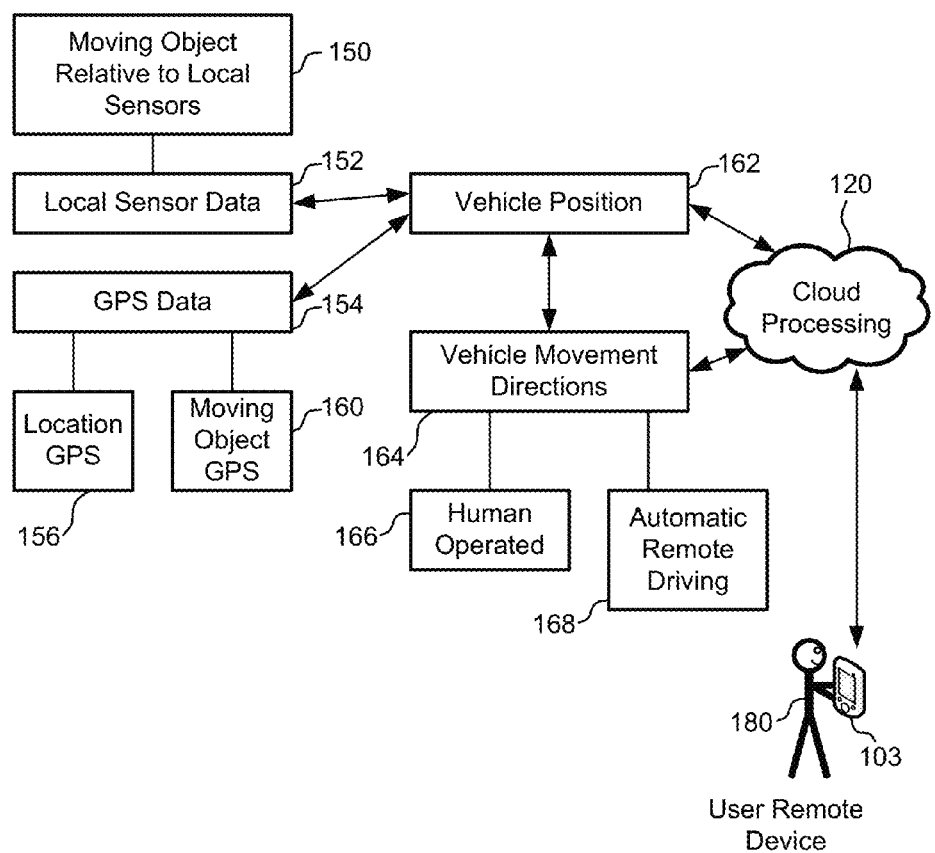

FIG. 2 illustrates an example of data and data sources that can communicate with a cloud processing 120. Example data can include vehicle position data 162 which can include data of moving objects relative to local sensors. For example, the data can include how fast the vehicle is moving 150 when the vehicle moves past specific sensors located within garage 100. Local sensor data 152 of the vehicle can also be used to provide vehicle position 162. Local sensor data 152 can also include sensor data from other vehicles that may be stationed within garage 100. This local sensor data can also include sensor data of other vehicles that may be moving within garage 100, for example, the heading, speed, and other coordinates of vehicles that may be moving in proximity to other vehicles.

By using this information, it is possible to define rules that avoid vehicle collisions when a plurality of vehicles are in proximate thresholds of one another in garages or locations that allow self-parking or self-moving of vehicles without human drivers. GPS data 154 can also become indicated to identify vehicle position 162, as described above. GPS data can be location GPS data from one or more GPS satellites. The GPS data can also be obtained for moving objects or structures 160. Vehicle movement directions 164 can also be identified or communicated between the vehicle position 162 data based on human operated vehicles 166, and automatic remote driving 168 vehicles. Cloud processing 120 will also provide easy communication for user 180. User 180 can be using a mobile device 103 to communicate with cloud processing 120. For example, an application on a mobile device 103 can communicate with cloud processing 120, which in turn will enable the user to select that the vehicle perform self-parking operations, can pay for parking privileges, can be provided with notifications of the location of the vehicle that has been parked in garage 100, and can be provided notifications or information when the vehicle is moved within garage 100. User 180 can also access cloud processing 120 from any computer connected to the Internet, which will allow the user to view status reports regarding the user's vehicle, including when the vehicle is automatically driving itself, its current position, a history of its locations at any given time, its status when located within the parking structure or location, etc.

Figure 3:
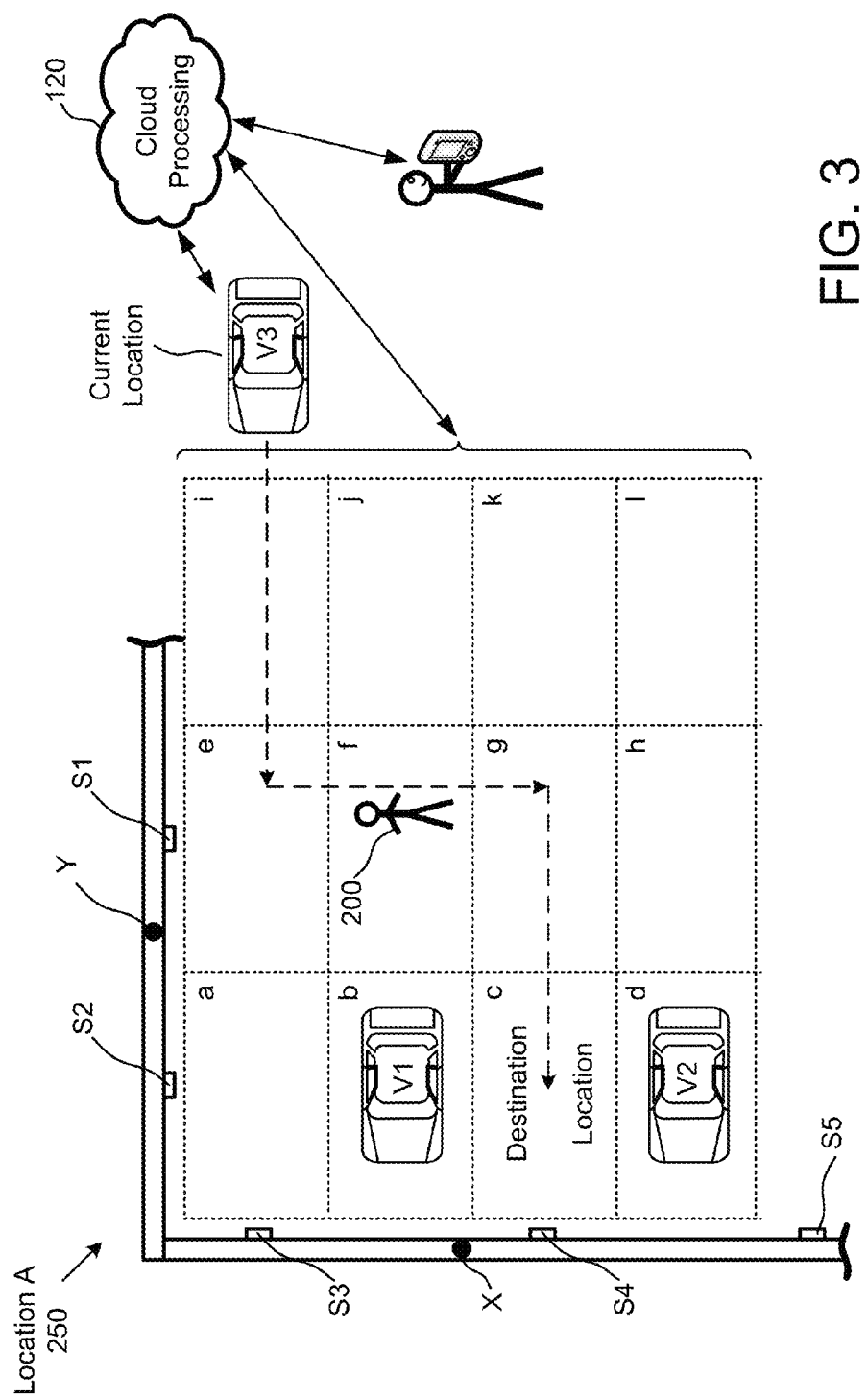
FIGS. 3 and 4 show examples of a vehicle moving to a parking location and associated mapping data for the location, in accordance with some embodiments.

FIG. 3 illustrates an example of location A 250, in accordance with one embodiment of the present invention. In this example, a partial view of a parking structure is shown, where a plurality of zones within the parking structure are identified. The zones are identified as zones a–l. The zones can be identified in terms of their volume, or 2 dimensional space. The sensors can include audio sensors, visual sensors such as cameras, ultrasonic sensors, IR sensors, etc. Any of these sensors can provide details regarding whether the location includes an object, identifies the object, identifies a moving object, identifies an object that should be in that location, identifies an object that should not be that location, logs information regarding objects in specific locations, etc. In this example, a vehicle v3 is moving from a current location to a destination location. The destination location is a parking space in zone C.

Various sensors S1, S2, S3, S4, S5, are located throughout location A. Specific locations shown for the sensors is not important, as the sensors can be located in any location, whether to identify volumes of space, weight of vehicles, presence of vehicles, presence of humans, presence of pets, presence of other vehicles, presence of other vehicles moving, relative movement of vehicles or objects, etc. As the vehicle moves and traverses a path, a human 200 is shown to be located in zone f.

This information is provided to cloud processing 120 and such information can assist in stopping the vehicle from colliding with human 200. In one embodiment, cloud processing 120 may communicate with one or all of the fixed sensors of location A, some of the fixed sensors, data produced by the sensors, data produced by other vehicles within the location, information generated by the moving vehicle that is traversing between the current location and destination location, etc. This information is being communicated and exchanged with cloud processing 120, as each vehicle will include processing power as noted above to communicate over the Internet concerning its location, its movement, its relative movement other vehicles, and a programmed path which the vehicle is to traverse.

Figure 4:
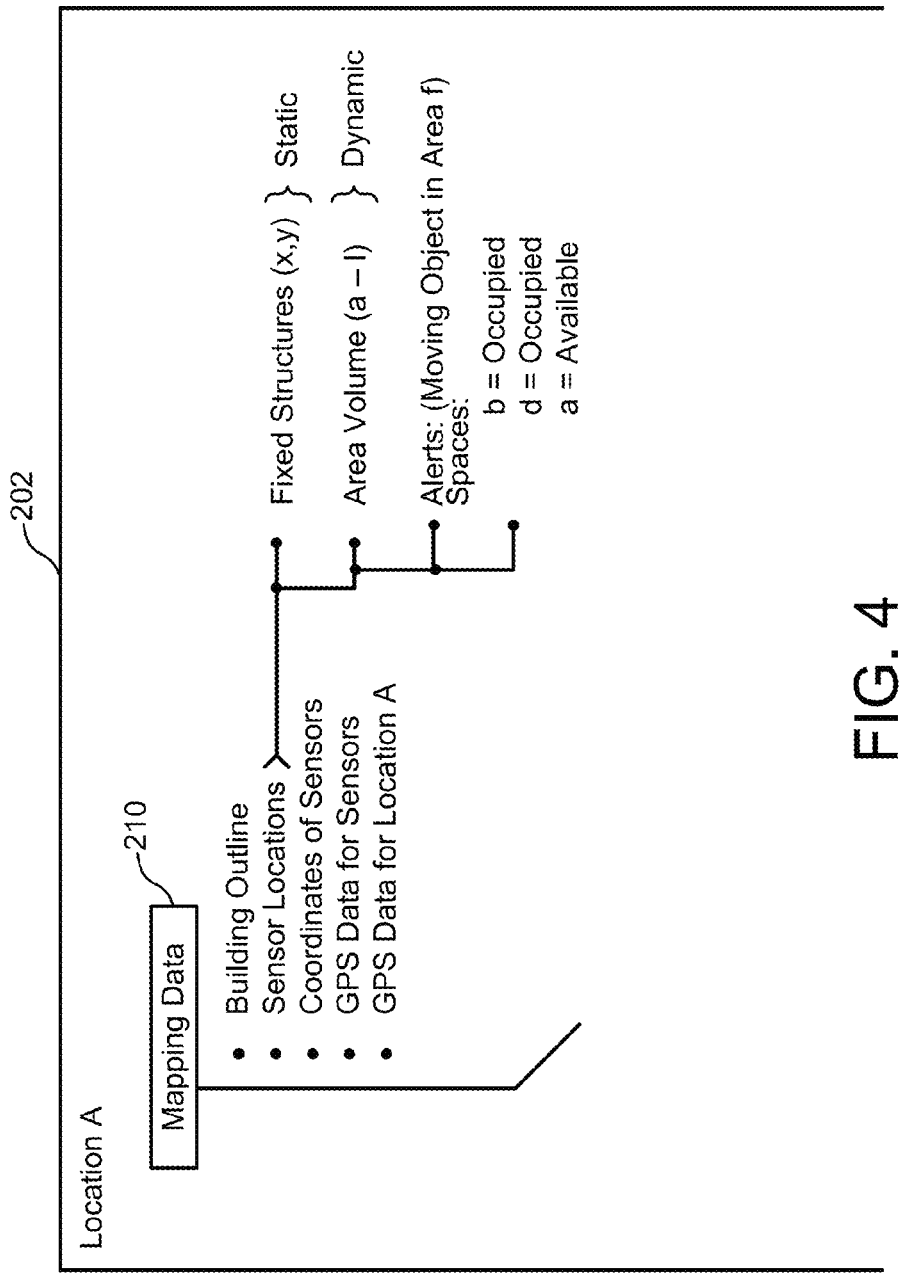

FIG. 4 illustrates an example of information 202 that includes mapping data 210 for location A, in accordance with one example of the present invention. In this example, mapping data 210 can include, without limitation various information metrics, including building outline, sensor locations, coordinates of sensors, GPS data for sensors, GPS data for location A, correction data for calibrated GPS locations of sensors, etc. In addition, the very sensor locations can include fixed structures, such as structures X and Y. These structures would be static structures within the location. The sensor locations can also identify following areas, such as volume areas a–l. As mentioned above, the volume areas can produce dynamic data, as information regarding what is present in those specific volume areas changes over time, including changes occurring while vehicles are in progress in their move between a current location and destination location.

These dynamic changes are in important to continuously monitor and update back to cloud processing 120, so that cloud processing 120 can communicate updates to the vehicle in substantial real-time. Also shown are sensor location alerts. Alerts can include alerts to the operator of a specific location (for example the parking garage attendant), the owner the vehicle, or another process that automatically terminates movement of the vehicle when an obstacle is presented. Various rules and databases can be accessed to determine what actions vehicles can take or should take when specific obstacles are encountered, and when the vehicle can resume movement after encountering such an obstacle. Tracking when the obstacles are encountered and where they are encountered can also be utilized to define metrics for specific locations. For example, if certain locations produce a lot of alerts, that location needs to improve its management of space to avoid accidents.

The tracking can also be used to generate reports/notifications that are produced and distributed to safety coordinating officers of specific locations (or vehicle owners), or to identify information that occurred before or after an accident or incident at a specific location such as a vehicle collision, vehicle theft of attempted theft, robbery, attempted robbery as well as panic situations during crimes. These alerts can also be provided with historical data associated with the alerts. The historical data can include images taken by cameras of the specific locations where the alerts occurred. The images can be videos, video clips, still images, collection of still images, audio files, audio snippets, that are accessible instantly over cloud processing 120.

This information can also be accessible via cloud processing 120 after a specific incident is reported. For example, if a burglary or crime occurred within the location, the sensor data of the location as well as the sensor data of the vehicles can be coordinated to identify when and who traversed specific locations within the area. In one embodiment, the collected data can be partitioned to allow certain data to be shared with the owner of the vehicle and certain data to be restricted to the owner or operator of the location where the vehicle is self-parked.

Figure 5:
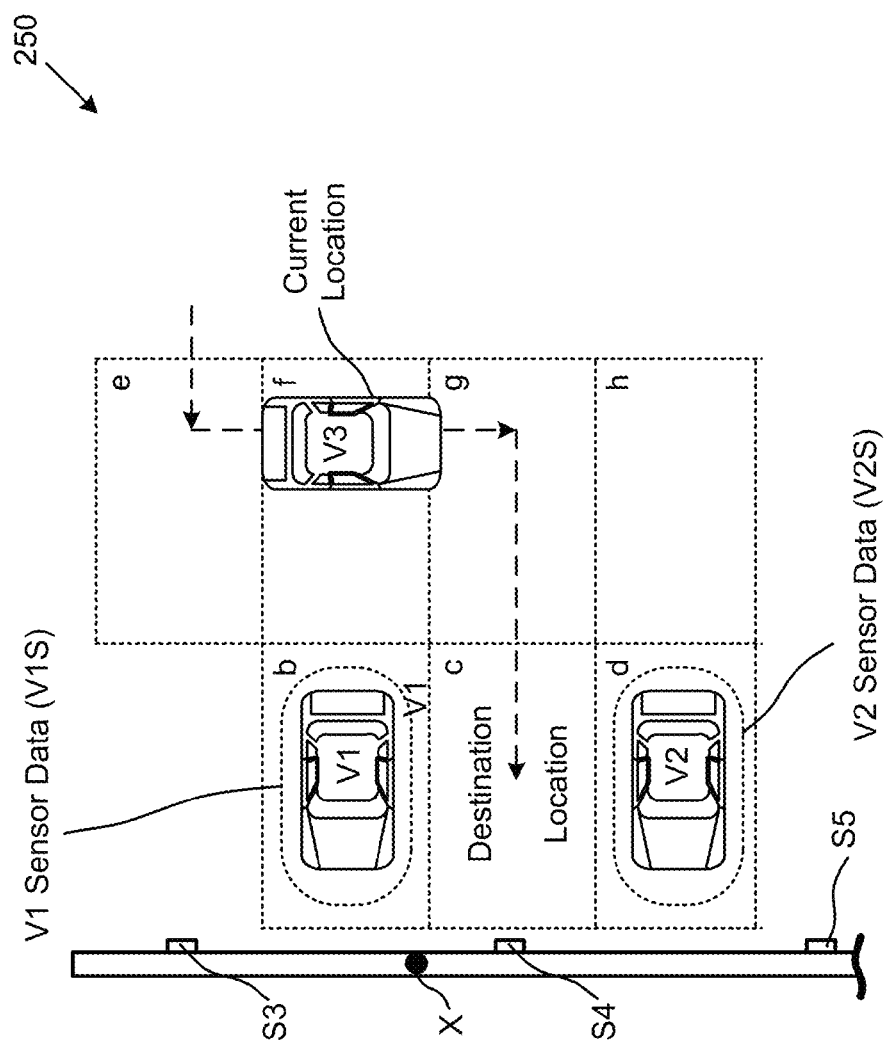
FIG. 5 illustrates a vehicle moving from a current location to a destination location, in accordance with some embodiments.

FIG. 5 illustrates an example where each of the vehicles parked in the location 250 can include sensor data. The sensor data for vehicles v1 and v2 are shown as slight outlines around the vehicle. In this example, these vehicles are parked in spaces b and d. As vehicle v3 moves along a path to a destination location, the sensors of the parked vehicles v1 and v2 are also utilized by the cloud processing system 120, along with data from sensors of moving vehicle v3, to avoid collisions with vehicles within location 250. For example, if any of the parked vehicles were to begin to move, that information can also be used in conjunction with the information of the 1st moving vehicle, thus avoiding a potential collision when the vehicles are in self-drive mode. Incidentally, the sensor information is also utilized or be useful to prevent accidents when the vehicles are being used or driven by humans. Accordingly, the sensor information described herein, and if synchronization with cloud processing system should not be limited to self-driving vehicles, but can also be applied to any vehicle that is being driven to avoid collisions between the vehicles when there is between self-driving and self-driving, or human driven and self-driving.

Figure 6:
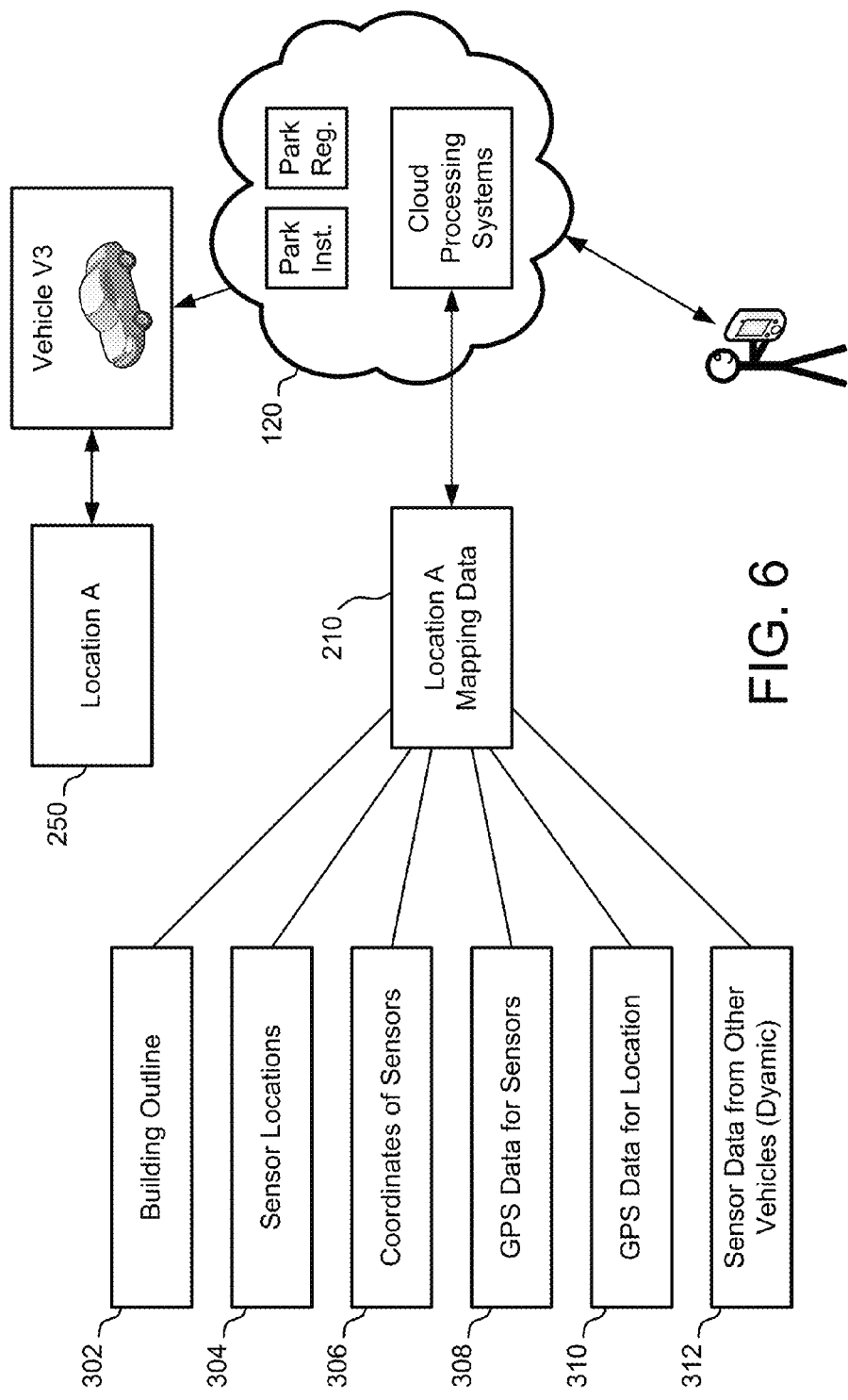
FIG. 6 illustrates exchanges of data for a location and cloud processing services, in accordance with some embodiments.

FIG. 6 illustrates an example of the types of data that can be provided and associated with a location A to generate mapping data for that location. In this example, without limitation, various pieces of data can be communicated or associated to a location. For example, building outline data 302, sensor locations 304, coordinates of sensor locations 306, GPS data for sensors 308 and any calibration data, GPS data for locations 310, sensor data from other vehicles (which may be dynamic as vehicles move or are stationary) 312. This information can be associated to define the mapping data of a location 210. Cloud processing systems 120 can then receive the mapping data 210 to enable execution of requests for self-parking. For example, a user using a mobile device can instruct or request that a vehicle begin a self-parking operation. For example, if the user drives up to a parking structure or garage, and then selects on their mobile device to park the vehicle, the vehicle will communicate with the cloud processing system and instruct the vehicle on how to proceed to park the vehicle within the parking structure by maneuvering and negotiating obstructions.

The cloud processing system can therefore provide parking instructions to the vehicle (for example vehicle v3) that is to be parked and location A 250. The instructions can include how to move the vehicle within the parking structure, or simply provide the mapping data of the vehicle to allow electronics within the vehicle to traverse the vehicle within the location. In other embodiments, the information as to how to move the vehicle within a specific structure may be governed by specific rules of the specific structure. For example, specific structures may require the vehicles being told to park can only move at 5 miles an hour. In other embodiments, the cloud processing system can be provided with a range of speeds that can be dictated to specific vehicles for specific locations. Therefore, a set of rules is exchanged between the cloud processing system and a specific location.

In one embodiment, when a user decides to park a vehicle in a parking location, that parking location may be a registered parking location with cloud processing systems. By being registered, any number of vehicles that also have access to cloud processing systems and have an account can enable users to park using some park algorithms for the specific parking locations. By being a registered parking location that accepts self-driving parking vehicles, the registered parking location can send rules back to the cloud processing system to dictate where and how and at what speeds vehicles shall be parked within the location. Duration of parking within the location can also be communicated back to the cloud processing system as well as the fee charged to the user for time parked within a parking structure.

A user's account can be debited automatically, such as using an e-commerce debit system once the vehicle has been parked in a specific location. Notifications to the user can also be provided when the user has parked at a specific location, such as time in, time out and duration of park at a specific location as well as any associated charges and overtime fees. The user can also be provided with an application interface that allows the user to extend the time of parking, and pay for extended periods of parking within a location or set up automatic parking fee renewals to avoid expired meters for instance. The user can also provide cloud processing systems with rules for how the vehicle shall be moved within the location. For example, the user may wish that the automatic park system only move the vehicle at 3 miles an hour. In this embodiment the user can set the speed at which the vehicle can be auto parked. In other embodiments, rules between the parking location, the cloud processing system, and those set by the user can be synchronized or sorted out to define the appropriate speed, location of parking, and other parameters for moving a vehicle using self-driving techniques.

Figure 7:
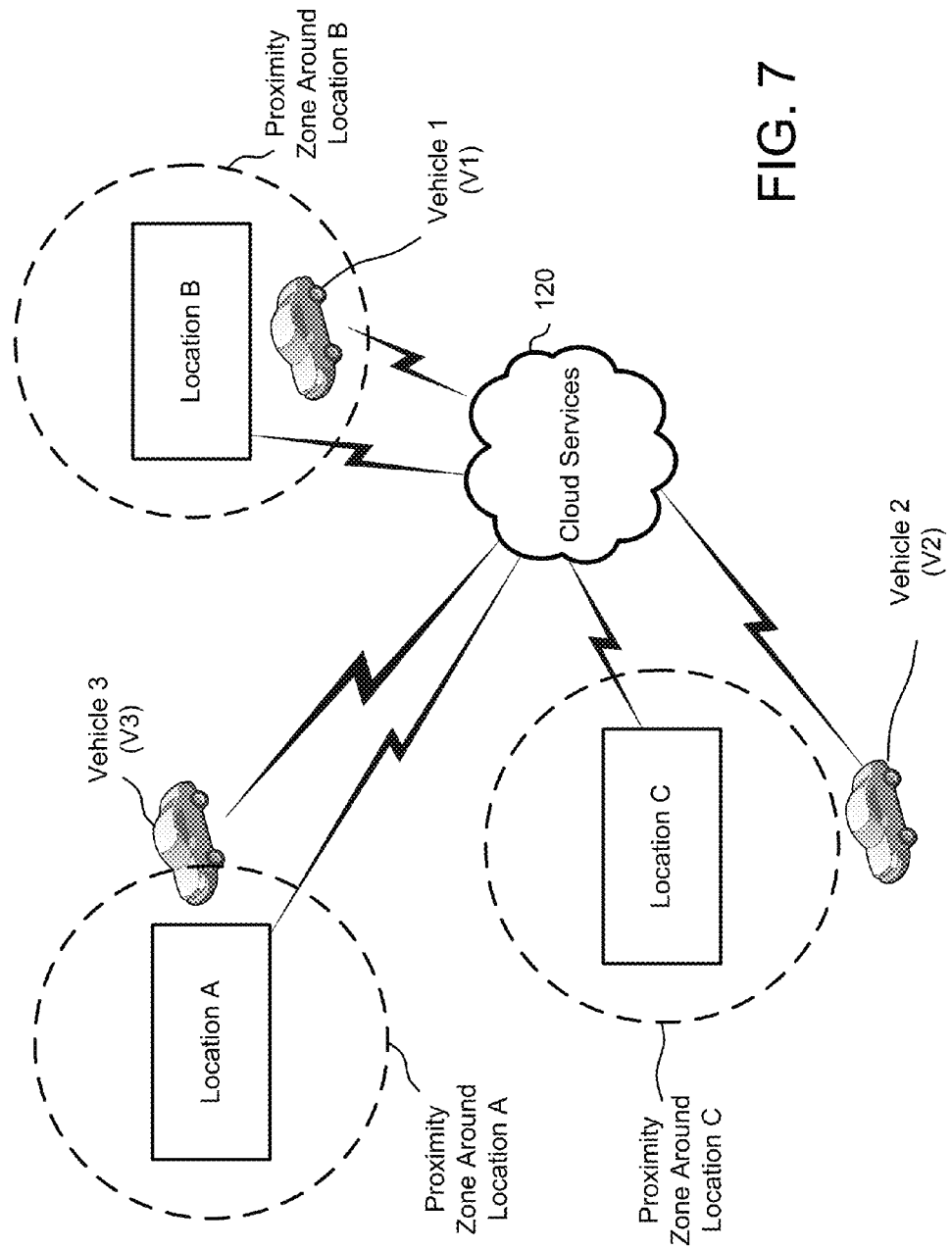
FIG. 7 illustrates an example of vehicles moving in proximity to parking locations, in accordance with some embodiments.

FIG. 7 shows an example where a vehicle has entered a proximity zone around a specific location, and the vehicle has communicated with cloud processing 210 as well as the location. In this example, if the vehicle enters the proximity of a specific location, that vehicle will be provided with mapping data of that location. In one embodiment, the mapping data can include the data associated with the location such as the coordinates of the physical structures, and/or moving objects within a location. However, the mapping data can be simply made accessible to the vehicle, without downloading.

In either case, the vehicle will not need the mapping data for all locations at all times, and the mapping data for specific locations will be made available when the vehicle enters the proximity zone around the location. Thus, if the user driving the vehicle is far from a specific location, the mapping data for that location will not be made accessible to that vehicle. In other embodiments, when the vehicle has entered the proximity zone around a location, and that vehicle is in that proximity zone for a threshold period of time, the mapping data will be made available or downloaded to the vehicle. For example, if the vehicle has entered the proximity location of a location for at least 2 min, then the mapping data will be made available to that vehicles electronics system. In other embodiments, the threshold period can vary and can be set by the cloud processing system. Examples can include a threshold of 10 seconds, 20 seconds, 30 seconds, 1 min, 3 min, 4 min, 10 min, etc.

Figure 8:
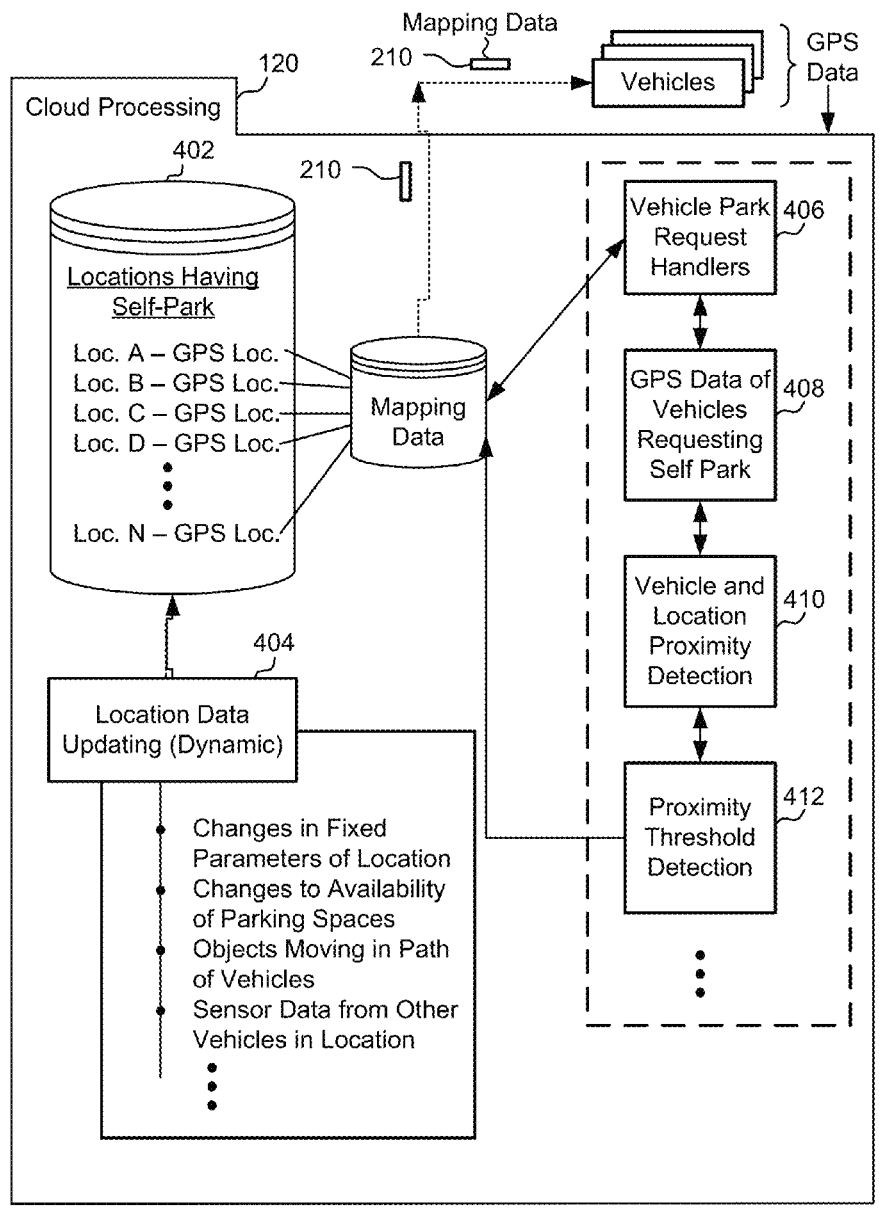
FIG. 8 illustrates data and processing that may be executed or stored in cloud processing, in accordance with some embodiments.

FIG. 8 illustrates an example of cloud processing 120, where databases holding data of location with self-park functions 402 can be monitored and managed. In one embodiment, the various locations and sets of GPS location information can be stored in a database, and that data can be updated with location data updating 404. Varies examples of data updates are provided in FIG. 8, and such information can be uploaded to or made accessible to the various databases. As noted above, the databases and processing can be managed in a distributed processing fashion. The distributed processing can be across multiple geographic locations, multiple data centers, multiple virtual machine processing systems, etc. In one embodiment, cloud processing 120 can include logic for vehicle park request handlers 406, GPS data vehicles requesting self-park 408, vehicle and location proximity detection 410, proximity threshold detection 412, etc. This information can then be synchronized with mapping data of the various locations and the mapping data can then be communicated to the various vehicles when the mapping data is needed by the various vehicles.

Figure 9:
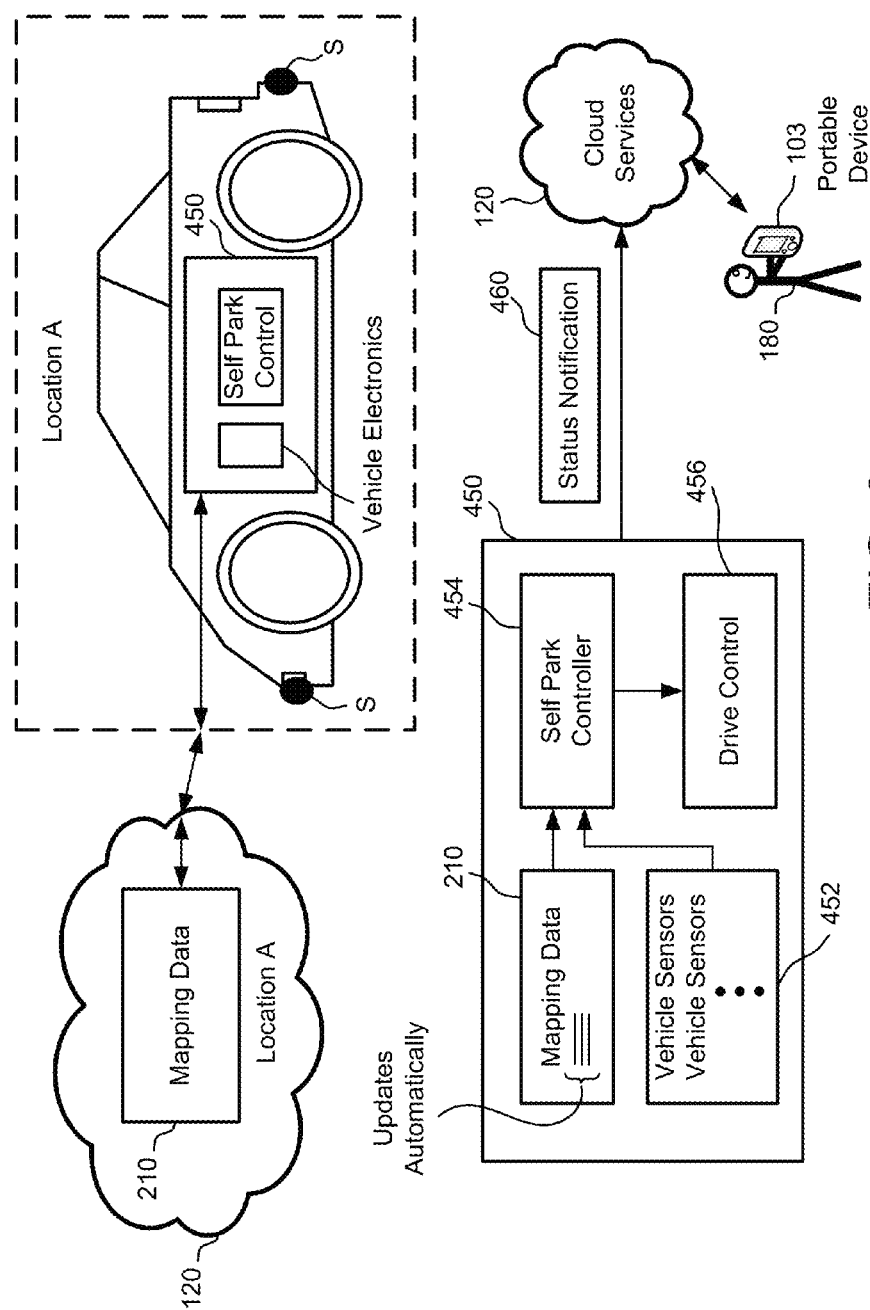
FIG. 9 illustrates a vehicle communication with cloud processing and a user also communicating with cloud processing via a portable device, in accordance with some embodiments.

FIG. 9 illustrates an example where cloud services 120 forwards mapping data for location A to a vehicle, and the vehicle electronics 450 receives the information. This information will be communicated to the vehicle continuously, at certain times, or on demand. In one embodiment, the vehicle electronics will also include the Internet communication protocols and systems to maintain wireless connectivity during movement of the vehicle, or when the vehicle is stationary. In one example, the vehicle electronics can accept mapping data 210, which may be updated dynamically as noted above. The mapping data can be provided to the self-park controller 454 of the vehicle. Vehicle sensors 452 of the vehicle can be communicating data to the self-park controller as well as vehicle cameras. The vehicle cameras can also be obtaining data during, after or before the vehicle begins to move. The vehicle cameras can be located in all locations around the vehicle. The vehicle cameras can be located in the front, in the rear, under the vehicle, above the vehicle, to the sides of the vehicles etc. Other sensors the vehicle can include ultrasonic sensors, heat sensors, IR sensors, sound sensors, microphones, etc.

In one embodiment, this data can be provided to the self-park controller 454 and the self-park controller 454 can communicate with the drive control 456. Drive control 456 can then communicate with the vehicle systems to move the vehicle to a desired location. As the vehicle moves, or the vehicle is stationary, specifications for 60 can be provided to the cloud server 120, to allow user 180 to view dynamic status updates concerning the vehicle at all times. A portable device 103 is shown being held by the user 180, but it should be understood that an type of device connected to the Internet and having access to cloud server can communicate with the vehicle to provide receive or send notifications or control to the vehicle.

Figure 10:
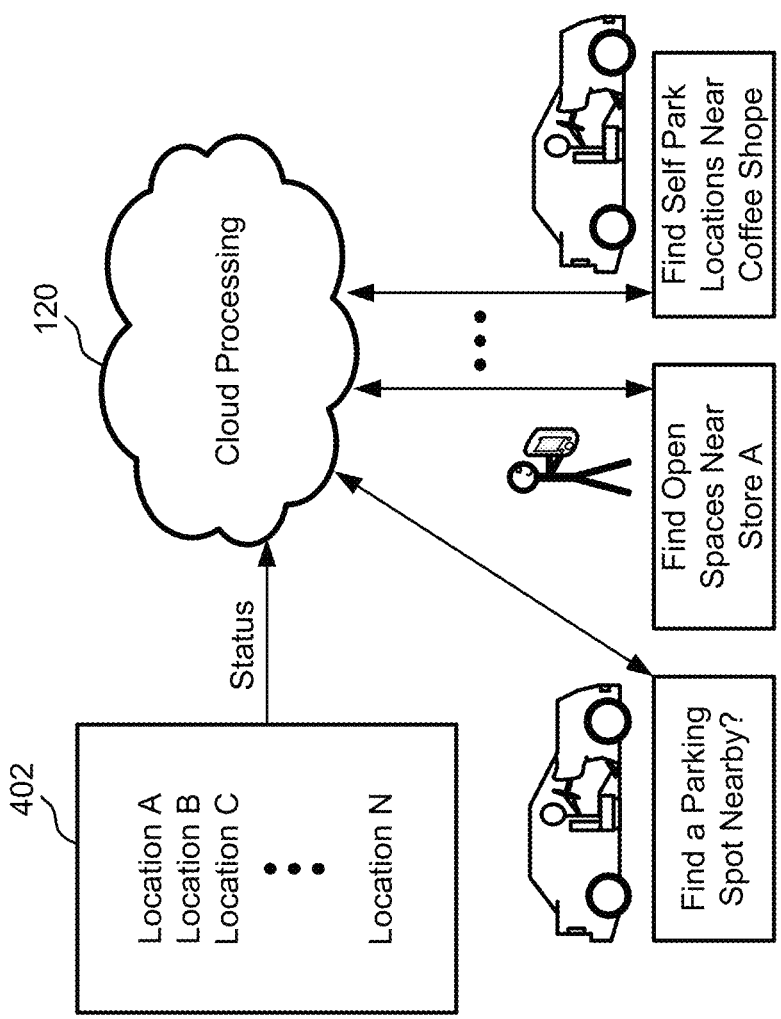
FIG. 10 illustrates cloud processing providing parking location data, locator data for parking spots, locators near specific locations, and the like, in accordance with some embodiments.

FIG. 10 illustrates an example where various locations 402 provide status to cloud services system 120. In this example, the various locations are registered locations with cloud services, so that any vehicle can access any location and obtain information concerning the location, such as mapping data. In one embodiment, users may wish to get information, such as information helpful for finding a parking spot nearby. This information can be communicated by the vehicle electronics or a portable device of the user 103 to cloud services requesting if the current location has a parking space nearby the GPS coordinates of the vehicle. In another embodiment, a user needs to be in the vehicle to find open spaces near specific store or commercial location or mapped destination. In other embodiments, the user may wish to locate a coffee shop and find a space near the coffee shop. This information can also be obtained from cloud services, as the locations within 402 will hold information about what locations parking spots are open at any particular point in time.

In one embodiment, advertisers can also sponsor parking spots if users view an advertisement. In still other embodiments, advertisers can set up rewards for parking a certain locations, and the locations can be branded for the advertiser for a given period of time. For instance, advertising in a parking location can be digital, in the form of screens placed near and around the parking location. When a user for which an advertisement is destined enters the garage or moves around a parking location, the advertisement on the screen can be custom changed for that period of time when the user is near the screen or area of the parking location. Since the user's parking was sponsored by the advertiser, the user should expect to see advertising from that advertiser in and around the parking location.

Figure 11:
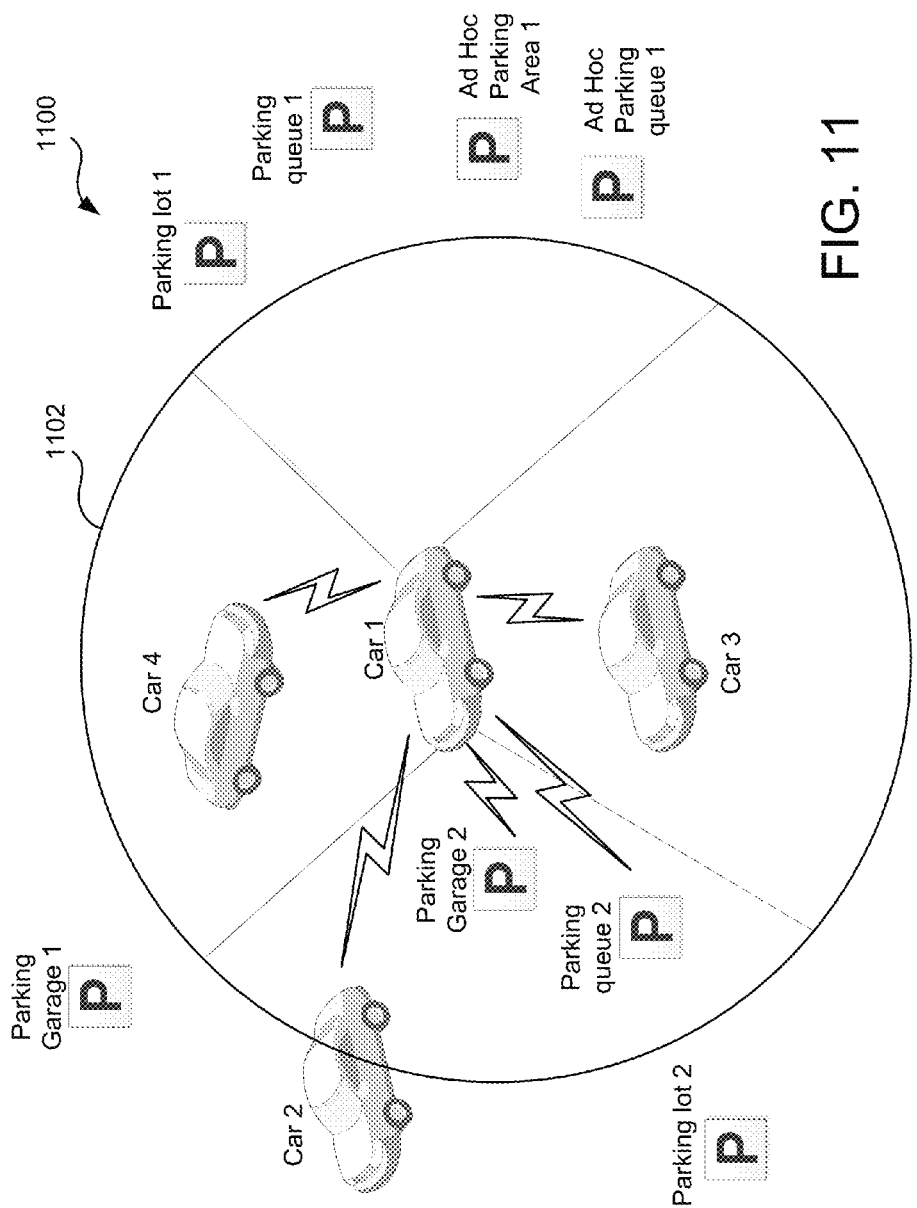
FIGS. 11 and 12 show vehicles in range of various parking locations, in accordance with some embodiments.

FIG. 11 shows in one embodiment, a collection of vehicles, parking garages, parking queues, parking lots and ad-hoc parking areas 1100 all having independent headings, speed and location if applicable. In one embodiment, each of the vehicles, structures and objects shown have the ability to become aware of each other within a range 1102. Car 1, being one example, shows a sample radius of awareness around it. In this example, Car 1 is aware of Car 2, Car 4, Car 3, parking garage 2, and parking queue 2. Car 1 also keeps track of their heading, speed and location at any given time if applicable. Car 1 also knows that Car 2 is leaving Car 1's sphere of influence. Car 1 also knows that it is entering parking garage 2 and parking queue 2's sphere of influence.

Just as Car 1 is aware of all other vehicles, objects and structures around it, all other vehicles, objects and structures shown in this diagram 1100 may behave in the same manner. For instance, Car 1 is not only keeping track of all other vehicles, objects and structure in its vicinity, Car 1 may also be broadcasting its speed, heading and location information so all other cars, objects and structures in this diagram 1100 are aware of it as well. This system exists in the presence of a constantly networked environment where vehicles, objects and structures may communicate with each other with or without the use of a central processing system.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

Figure 12:
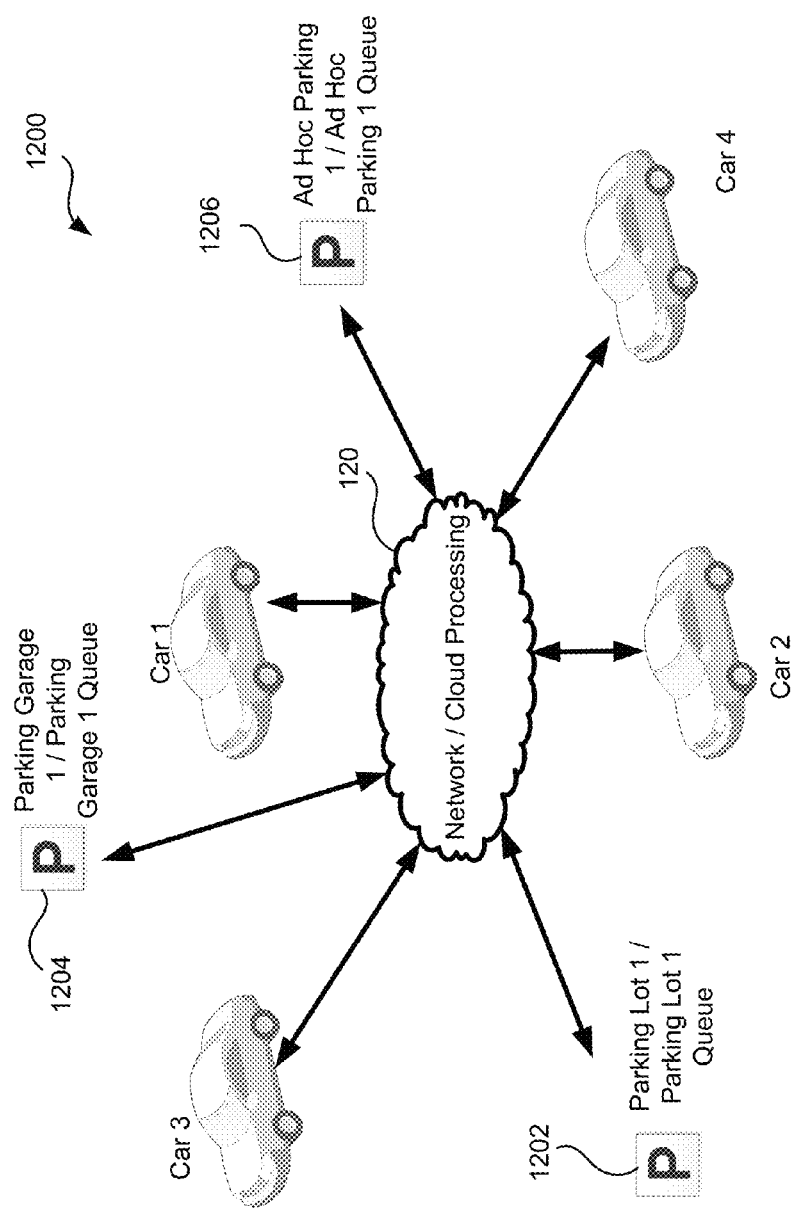

FIG. 12 shows a system 1200 in which vehicles, parking structures 1204, lots 1202 and virtual ad hoc parking areas 1206 all communicating wirelessly with all other connected vehicles, structure and objects around it with the use of a networked and cloud processing system 120. In this example, Car 1 may be sending its heading, speed and location to all of the other vehicles, structures and objects within communication range, GPS coordinate location or network and also receiving every other vehicles, structure and object's heading, speed and location within communication range using the same methods.

The use of an asynchronous network in which all vehicles, structures and objects within a certain communication range can "talk" to each other using the same protocol may be employed. In this case, the protocol used can be Ethernet through wireless mediums such as 802.11a, b, n, ac, ad or any other wireless communication protocol.

Figure 13:
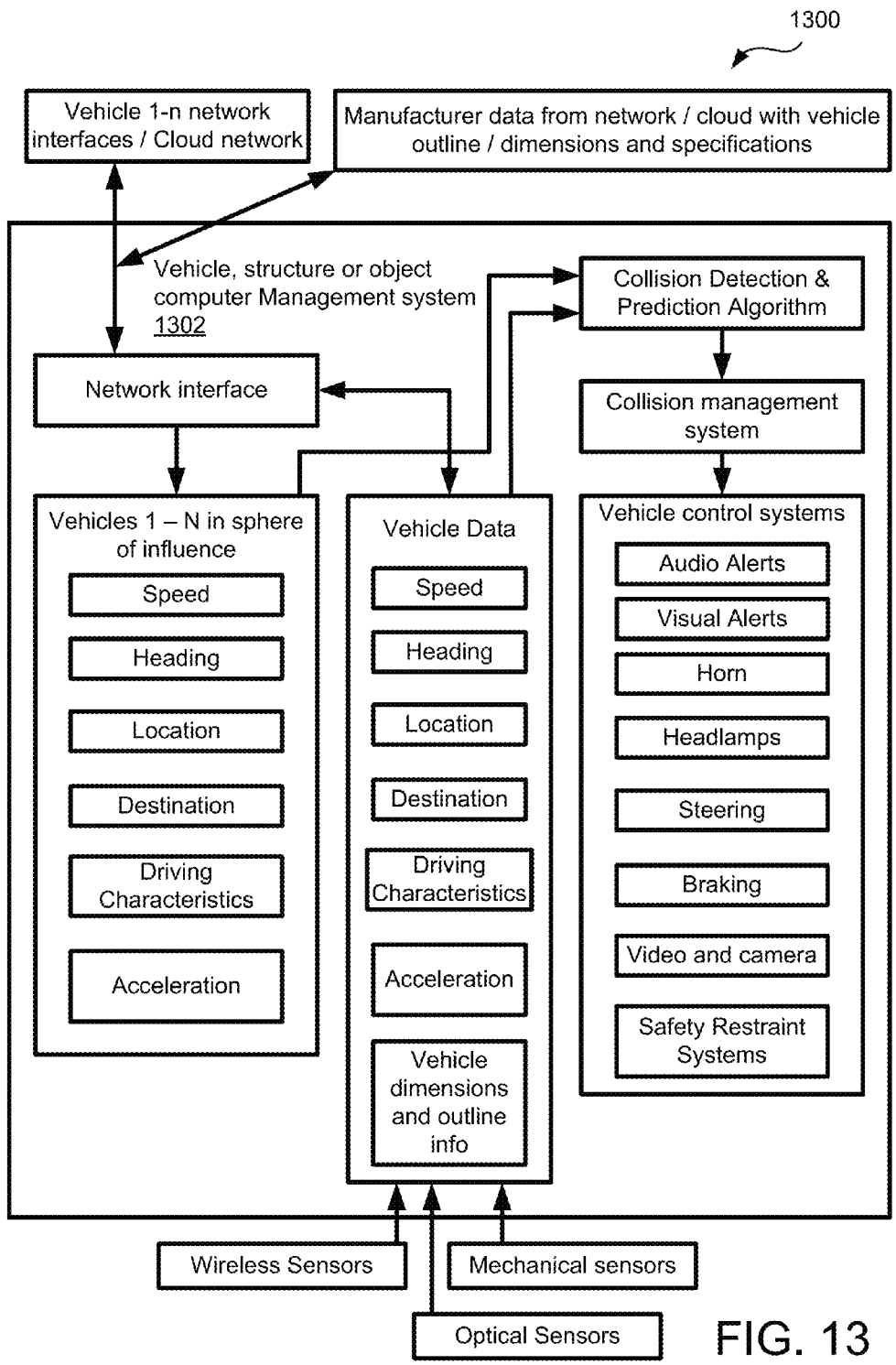
FIG. 13 shows example data regarding parking locations and vehicle data, and processing therefor, in accordance with some embodiments.

FIG. 13 shows a sample system 1300 with interfaces, data storage structures, sensor inputs, algorithms and vehicle, structure or object control systems 1302 used in collision avoidance on board each vehicle. Each vehicle will have a network interface, which communicates with other vehicle's network interfaces or a central/distributed cloud processing system. Each vehicle will store all data coming in from other vehicles in communication range. In one embodiment, this set of data may be kept in a table of all or some of the metrics including but not limited to speeds, headings, locations, outlines, buffers, destinations, driving characteristics and acceleration if applicable. Similarly, each vehicle may maintain a table of its own metrics including but not limited to speed, heading, location, outlines, buffers, destination, driving characteristics and acceleration if applicable. This data (or selected data that the user approves for public sharing) may be passed to other vehicles using the network interface, which then communicates with other network interfaces directly or through an intermediary such as a cloud processing system, Internet, router, network switch or combination of methods etc.

The vehicle metrics and data may be collected using a variety of sensors including but not limited to optical sensors, mechanical sensors, and networked sensors among others. These sensors can emit data as well as collect data. For instance, a vehicle may be 5 feet wide by 10 feet long but in order to communicate its dimensions and outline to other vehicles sensors must be calibrated. These sensors can be calibrated on board the vehicle, remotely through a management system connected to a device connected to the internet or can be transmitted automatically from the manufacturer. The vehicle's dimensions can now be shared with other vehicles on the road in order to avoid collision. The sharing of this data can be in the form of shared moving object detection (MOD) data. Thus, not only is one vehicle aware of the MOD around its vicinity, the same vehicle can be provide data regarding nearby vehicles and their MOD data. Furthermore, buffers can be instituted in order to ensure that the vehicles outline is not breached but extra room is given around each vehicle to further collision avoidance effectiveness.

Each on board computer on each vehicle may use data coming in from other vehicles together from data captured by the vehicle itself to feed a collision detection and prediction algorithm. In one embodiment, this algorithm may activate a collision management system that interacts with the vehicles control systems including but not limited to audio alerts, visual alerts, horn, headlamps, steering, braking, tactile feedback on the steering while, tactile feedback on the driver's seat, video and camera recording, safety restraint systems, combinations thereof, etc.

The collision management system may engage any combination of active and/or passive collision avoidance maneuvers using the vehicle's control systems. For instance, if two vehicles are traveling on intended paths that will result in a head-on collision at some point in the future, the systems on both vehicles will calculate if an early warning will suffice. Each of the two vehicles will alert their corresponding driver via audio, tactile feedback near, on or proximate to the driver's body, a visual alert, or combinations thereof. If the drivers do not correct their intended path and a collision is still predicted by the algorithm, more aggressive systems will engage such as applying braking power, reducing speed, or steering the one or both vehicles away from each other or away from an obstacle.

Figure 14:
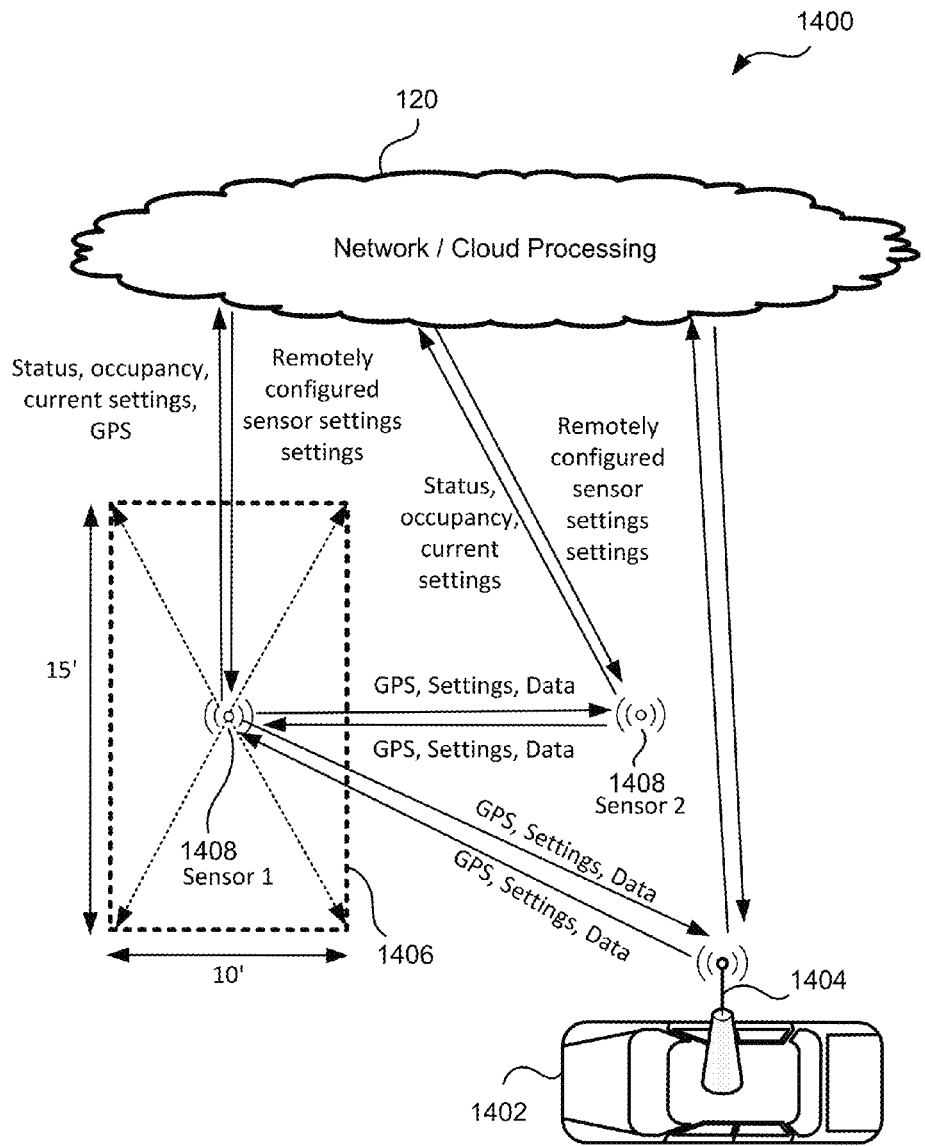

FIG. 14 shows an example of a virtual parking location boundary sensor system in conjunction with other virtual parking location boundary sensors and vehicles 1400. A virtual parking location boundary sensor 1408 may be deployed in an ad-hoc fashion to provide automatic parking facilities in temporary locations or within existing static structures. Once activated, sensor 1408 can transmit data about itself to other sensors, vehicles, structures and/or objects. A sensor 1408 can be instructed to produce a virtual parking boundary of 10 feet by 15 feet to facilitate the parking of a large vehicle, or the boundary can be dynamically adjustable on demand. The same sensor 1408 can be calibrated remotely using cloud processing 120 to produce a virtual parking boundary of 10 feet by 40 feet for instance to accommodate a large commercial semi-truck. Sensor 1408 can be manually laid out in any fashion as to construct any parking lot as long as the virtual boundaries of each sensor do not overlap. In the event that two sensors 1408 are activated and their virtual boundary intersect, a visual and audio cue will be given to the operator to aid in sensor spacing automatically. Once the sensors are sufficiently placed where their virtual boundaries do not intersect, audio and visual cues will cease.

Sensor 1408 has the ability to communicate with sensor 1404 located on vehicle 1402 for instance for the purposes of guiding a vehicle in parking either manually or automatically self parking at the location boundary produced by the sensor 1408. Sensor 1408 may communicate directly with sensor 1404 or may use cloud processing 120 as an intermediary as well as a combination of the two methods.

FIG. 15 shows one embodiment of a system 1500 where a parking area 1506 may exist in conjunction with an automatic parking drop-off location 1502. Vehicles that are equipped to use auto parking facilities may use auto park drop off locations such as 1502 to exit their vehicle before their vehicle proceeds to automatically park itself in a given parking location. In this example, a vehicle B has the ability, through the use of it's communication sensor 1404, to communicate with cloud processing 120, parking location sensor 1504 and individual parking spot sensors 1408 as well as other vehicle's communication sensors (vehicle C in this case) in order to safely guide the automatically parking vehicle B without human interaction.

Using communications regarding mapping data, locations and other metrics, a vehicle can be guided automatically to either the next available virtual parking spot boundary 1512 being produced by a sensor 1408 or to a particular virtual parking spot boundary 1512 of the vehicle operator's choosing. This example shows vehicle B being automatically guided to a virtual parking spot boundary as it traverses a parking lot, parking garage, ad-hoc parking area, drive way or charging spot bank area 1506 while dynamically and constantly communicating with all structures, vehicles and obstructions around it and with the use of traversing instructions communicated to the vehicle. As vehicle B traverses to it's final location within 1505, it dynamically and constantly provides feedback to all other dependent sensors and cloud processing systems.

In this example, a portable vehicle charging pad 1514 (or virtual pad) may be deployed and paired with any given sensor 1408 which is deployed to provide a virtual parking spot boundary. Portable vehicle charging pad 1514 powered by the grid, a generator or solar power 1510 may communicate with sensor 1408 through the use of its own sensor 1508 in order to establish that it is present. 1514 may also communicate with a networked cloud processing system through the use of its own sensor 1508 to aid in dynamic and remote administration (e.g., via GUI screens of any Internet accessible computing device, whether wired or wireless), reservation and payment options for use as well. After a portable vehicle charging pad pairs with a given sensor 1408, it can be registered on a remote distributed cloud processing system as ready to provide charging services. These services may be used on a first come first serve basis or through the use of a remote reservation system.

Such combinations or sets of virtual parking spot boundaries 1512 emitted by sensors 1408 can be placed in an ad-hoc manner for portal, temporary use such as outside large concert venues, for installation in home garage or driveway applications as well as large commercial or civic parking structures and locations. For instance, 10 count 1512 parking virtual parking spot boundaries are required for a special event where 5 must also provide charging facilities. A user can deploy 10 1408 auto-spacing sensors and pair 5 of them with 5 portable vehicle charging pads 1514 with the use of 1514's sensor 1508 in communication with 1408. These portable charging pads 1514 may be powered from the grid, a generator or solar power etc. Once the charging pads are paired with the virtual parking boundary, they can also be registered with the network/cloud processing 120 to provide in-advance-reservation ability.

Figure 16A:
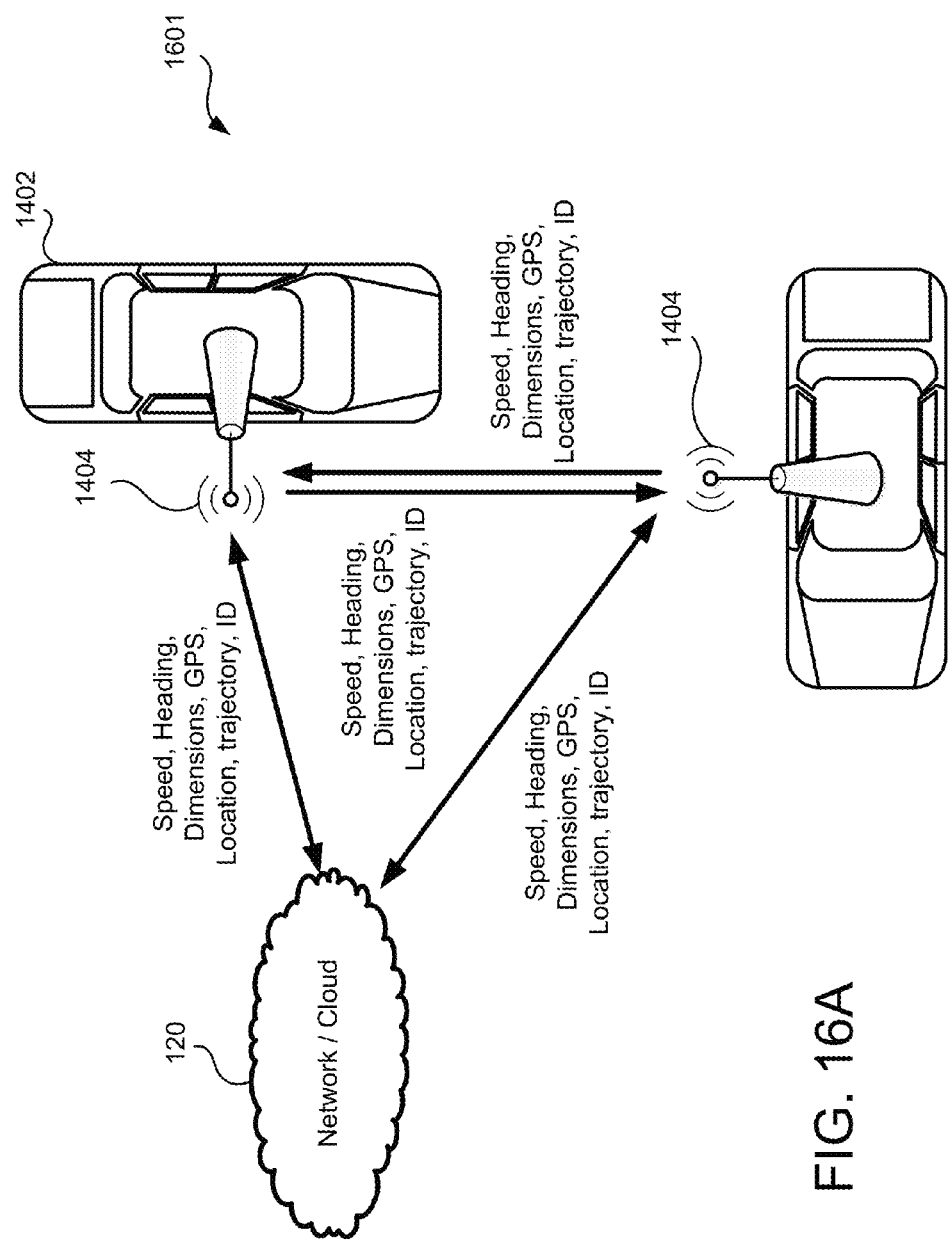

FIG. 16A shows one sample of a situation where two vehicles are traveling in arbitrary manners within a proximity threshold of each other 1601. Vehicles are registered with a network cloud processing 120 at any given time and will register with one another once they are in proximity of each other as well. In this example both vehicles transmit and receive data regarding their speed, heading, dimensions, GPS locations, trajectories and identification metrics dynamically and constantly. Vehicles use the transmitting sensors 1404 to communicate with each other or with cloud processing 120 at any given time. This information allows vehicles to become aware of not only each other, but also each other's intended paths, outlines and outlines plus buffer areas so as to maneuver together at the same time automatically with minimal or no human interaction not only in shared roadways but also in smaller contained environments such as parking lots, parking garages, drive throughs, emergency situations and collision prediction and avoidance.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another. This local communication will enable one or both vehicles to take correction actions or alert a driver to chance course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

Figure 16B:
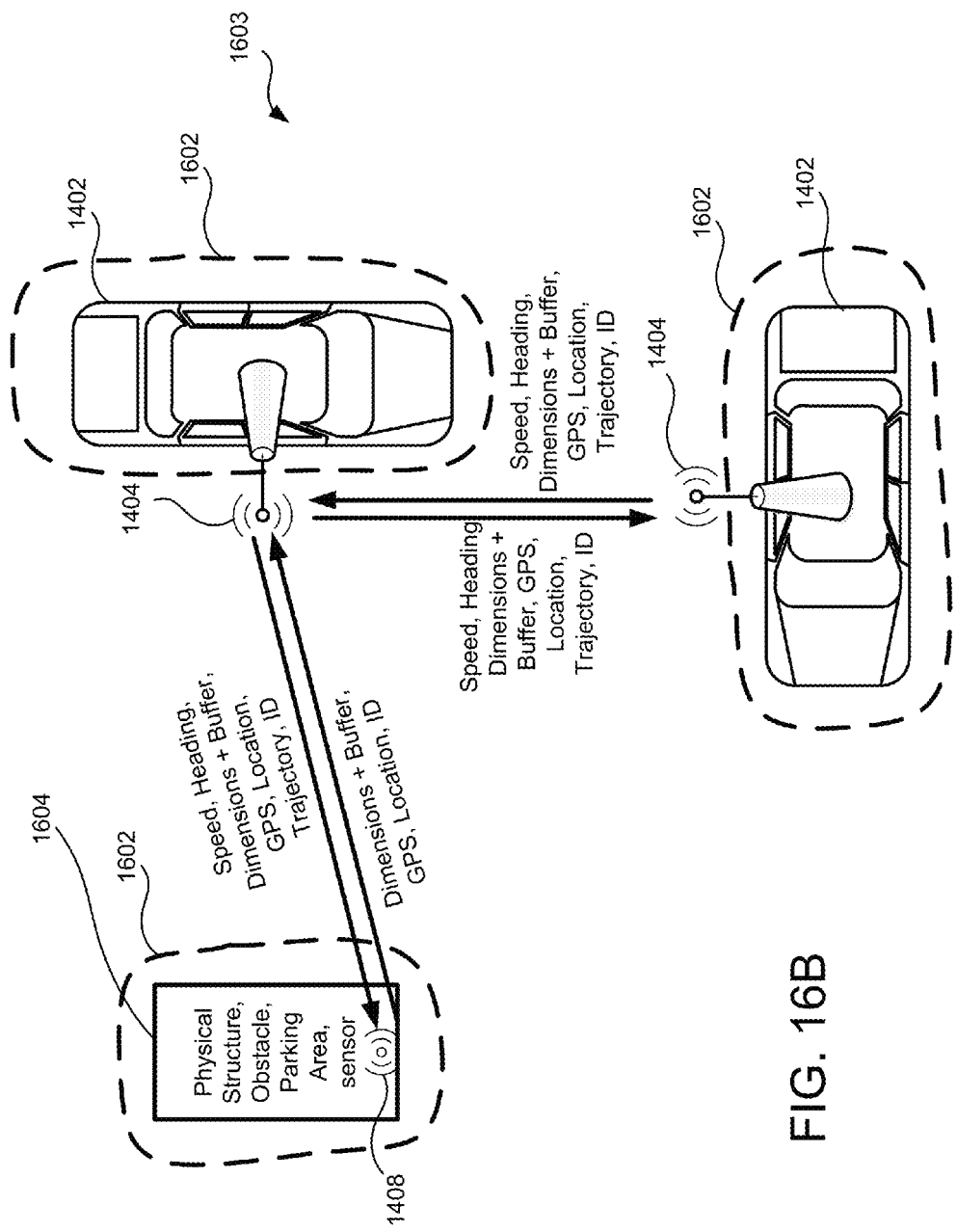

FIG. 16B shows one example of a situation 1603 where vehicle 1402 wishes to maneuver automatically without human interaction around a physical structure, around an obstacle or to a virtual or physical parking location emitted by a sensor 1408. Vehicle 1402 is in communication using its sensor 1404 with the sensor of the second vehicle. Both vehicles emit their dimensions plus any additional virtual buffer 1602 around the physical dimensions of the vehicle. Processing logic on board each vehicle use the metrics exchanged between the vehicles to calculate avoidance measures. The buffer 1602 may exist around vehicles, structures, objects or virtual boundaries and may be set statically by a human, dynamically in response to collision frequency or remotely by an operator or manufacturer. In this example, buffers 1602 ensure vehicles, objects and structures to not intersect, thus avoiding collision.

Figure 16C:
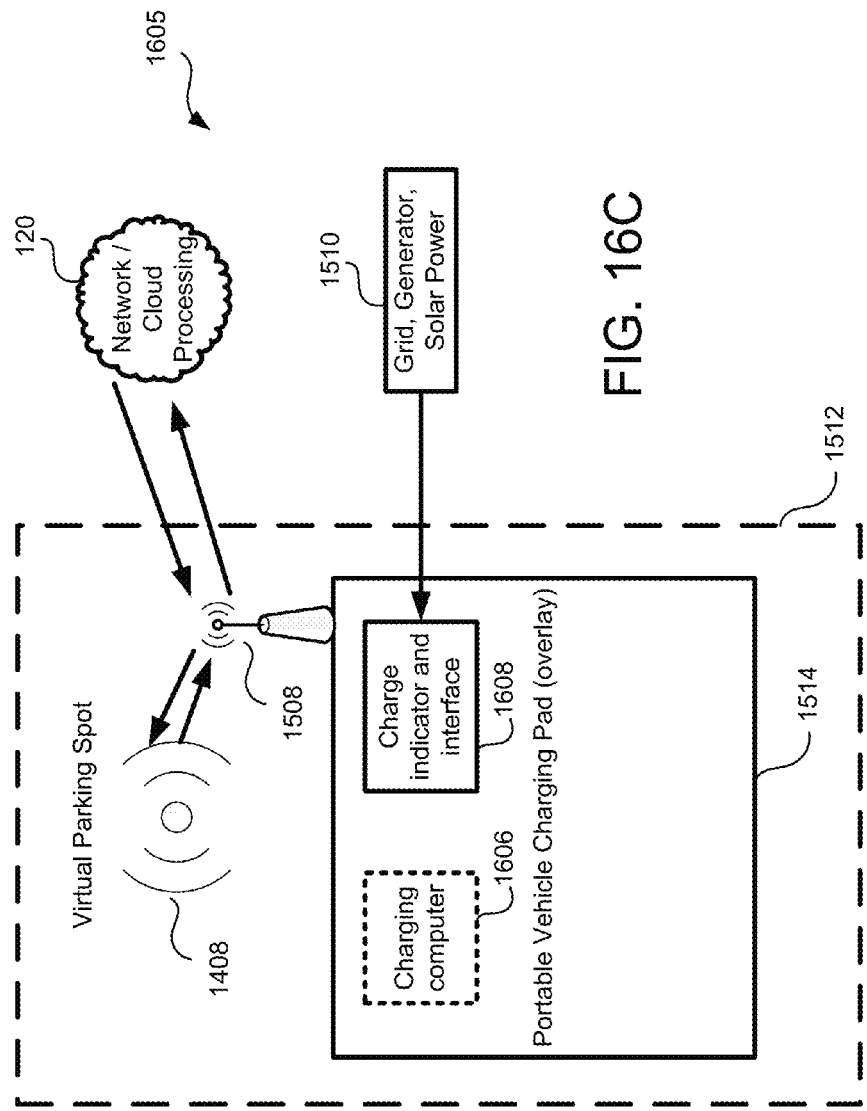

FIG. 16C shows one embodiment 1605 where a portable vehicle charging pad or overlay 1514 may be used in conjunction with a virtual parking spot boundary emitted by sensor 1408. In this example, electronics on 1514 such as a charging computer 1606 works in conjunction with sensor 1508 as well as charge interface and indicator 1608 to provide charging services to vehicles utilizing a virtual parking location 1512. This example shows a portable vehicle charging pad or overlay being powered in a portable fashion by the electrical grid, a generator or solar power 1510 in order to pair with 1512 by using 1508 to communicate with 1408 as well as registering with cloud processing 120; thus providing a combination of a parking location for a vehicle which also can provide vehicle charging facilities.

Once a vehicle has chosen to park or is instructed to park at a parking spot 1512 being emitted by 1408, the vehicle or vehicle operator or owner may opt to charge the vehicle if it is an electric vehicle (EV). A vehicle's communication sensor can communicate with the sensor on a virtual parking spot or portal vehicle charging pad to indicate to the vehicle operator or owner that charging facilities are available. Furthermore, the owner of an electric vehicle may have chosen to reserve not only the parking space but also charging type in advance. When an electric vehicle arrives at a parking space where an electric charging facility has been reserved, the vehicle will engage the charging facility or the charging facility may engage the vehicle to transmit the purchased charge.

Figure 17:
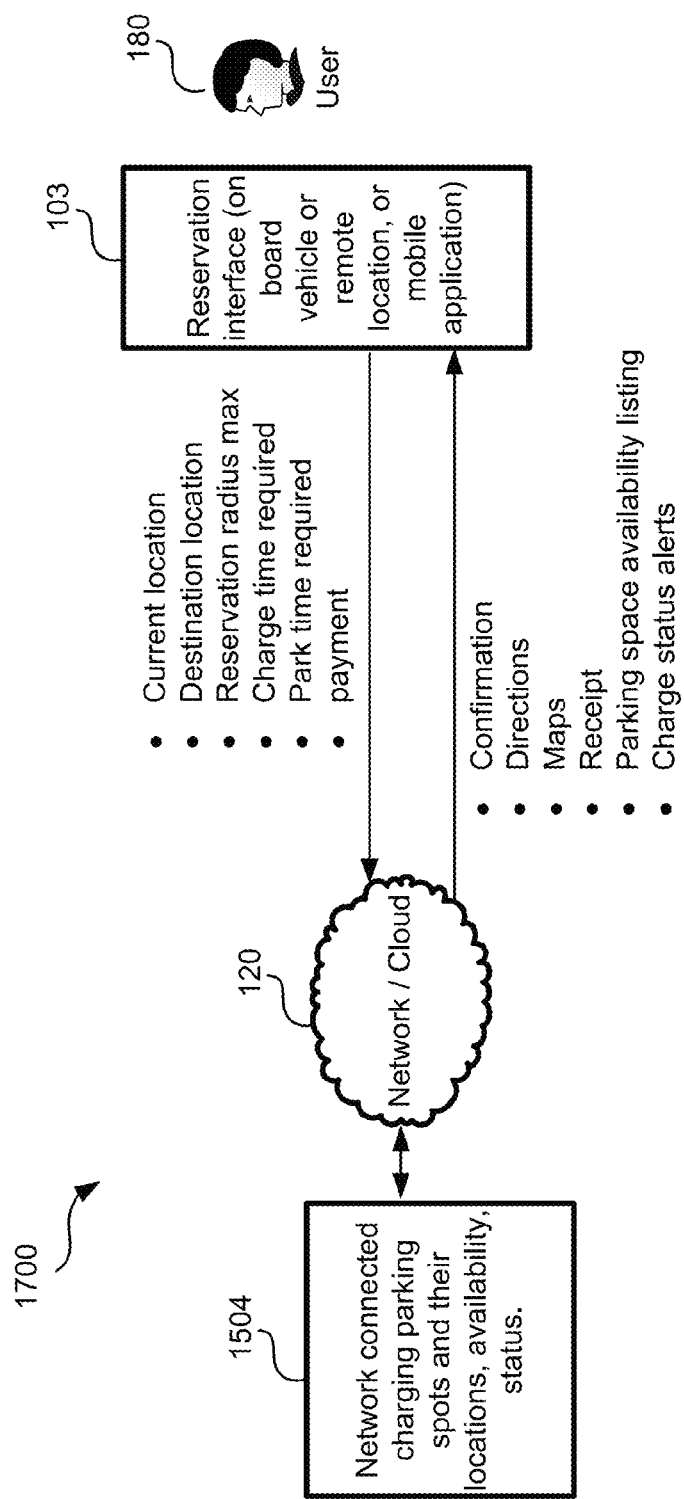
FIG. 17 illustrates a reservation system, logic for processing and networked services, in accordance with some embodiments.

FIG. 17 shows an example system 1700 where a user 180 may interact remotely through the use of cloud processing 120 with a reservation system tasked with providing information to users regarding the availability of networked connected parking spots, whether physical or virtual as well as reservation and payment facilities 1504. Users may remotely, though the use of a reservation interface on board a vehicle, remote internet connected device, mobile application etc. to search for and reserve parking and charging faculties in advance. A user may share the address, zip code or city they will be traveling to and would like to locate, reserve and purchase parking and or charging time in advance.

Once user 180 elects a parking space, parking time and or charging time and space, he or she will be provided instructions for arriving at the destination parking/charging location. Instructions for auto parking may also be sent to the user's vehicle to allow the user to leave their vehicle at an auto park queue location and walk away while the vehicle is left behind to automatically park without human interaction. Instructions can also be provided to the driver in the form of audio and/or video images (e.g., via a speaker and a display of the vehicle, or linked portable device). The example 1700 shows a listing of transactional data that may include but is not limited to the shown.

Cloud processing 120 technology is also provided, which provides processing resources to connected vehicles through a distributed network. In one embodiment, for electric vehicles, the cloud processing can communicate with various charging stations using Internet connections, where charge station metrics can be uploaded to the cloud processing system. The charge Station metrics can include availability of charge pumps, charge handles, charge plugs, charge mats (for wireless chagrining), volt bars, or other charge providing facilities.

Examples of such metrics can include the number of charge pumps available at particular period of time, historical availability times of the charge pumps, typical charge time estimates at particular charging stations, prices associated with the charge at the particular charging stations, feedback from customers through social networks, concerning the charging stations, and the like. The cloud processing can then process the charge station status, traffic information associated with locations around or between charging stations and a user's current location, and provide specific suggested routes displayed on the user's device 103 or sent to user 180's vehicle(s) or portable programmable vehicle profile(s). The route generator can provide guided routes to the various charging stations (e.g., charge locations), based on the user's 180 immediate needs, desire for discounts, sponsored rewards, or the amount of time it will take to obtain access to a charge pump at a particular point in time. Broadly speaking, a discount is a reward and a reward is a discount, and a sponsored reward is a discount that is at least partially paid by another party for a the benefit of the recipient of the reward.

The driver location processor can communicate the information concerning drivers to the cloud processing logic 120, so as to provide the most effective information concerning charge availability to the various drivers. For example, users in their particular vehicles may have a connected display or a portable device having access to the Internet. Based on the users location and charging needs, (and optionally the destination) the user can be provided with route options (e.g., one or more optional paths). The route options can be, for example, the fastest and most available charge Station (or charge providing devices) to the users current location, the cheapest charge available at a particular point in time, or information regarding charge prices for a particular future point in time.

Once the user selects a route option, the route generator can provide information concerning the charging station, and can also prepay or book a charging station slot. A charging station slot can include, for example a parking spot in front of a charging station. The charging station slot can be reserved if the user decides to prepay for the charging station, as a convenience. For example, if charging slots at a particular charge Station appear to be heavily used, a user can pre-reserve a charging slots ahead of time, so that when the user arrives at the charging station, the charging slot will be immediately available. This could be considered a convenience fee associated with pre-reserving of a charging slot, along a particular route. In another embodiment, the charging station can provide incentives to users to come to the particular charging station.

For example, if the user prepays for charge at a particular charging station, the charging station can provide a discount on the charge provided. For example, if the charging station wishes to fill a plurality a charging slots during a particular slow time, the charging station can communicate with the cloud processing and publish availability of its charging stations per particular period of time. A database associated with cloud processing will hold this information so it can be dynamically updated and accessed in real-time by users to fill their charging needs of their electric vehicles.

During that particular period of time, the charging station can offer discounts or rewards to users so that drivers can decide to visit the charging station instead of another charging station. Still further, charging stations can offer discounts for users to use the particular charging station, and the discounts can be offered by more than one party or entity. For instance, if the charging stations are located near a particular business, that particular business can sponsor discounts or rewards at the charging station to drive traffic to or near that particular business. When users are charging their vehicles at the particular station near the particular business, users can spend their time at the particular business while their vehicle is being charged.

Again, the information displayed to the user can be displayed in the vehicle's display screen or can be displayed on the users display device (e.g. smart phone, computer, tablet, etc.).

In one embodiment, a method for customizing advertisements at a location includes: (a) detecting presence of a vehicle at the location, the vehicle being registered to a user account that manages remote access to the vehicle over cloud processing logic on the Internet; (b) determining preferences for a user account; and (c) modifying display advertisements to show ad content that best matches ad content relevant to the user account, wherein the display advertisements include display screens viewable to occupants of the vehicle when the vehicle is detected to be present at the location.

Figure 18:
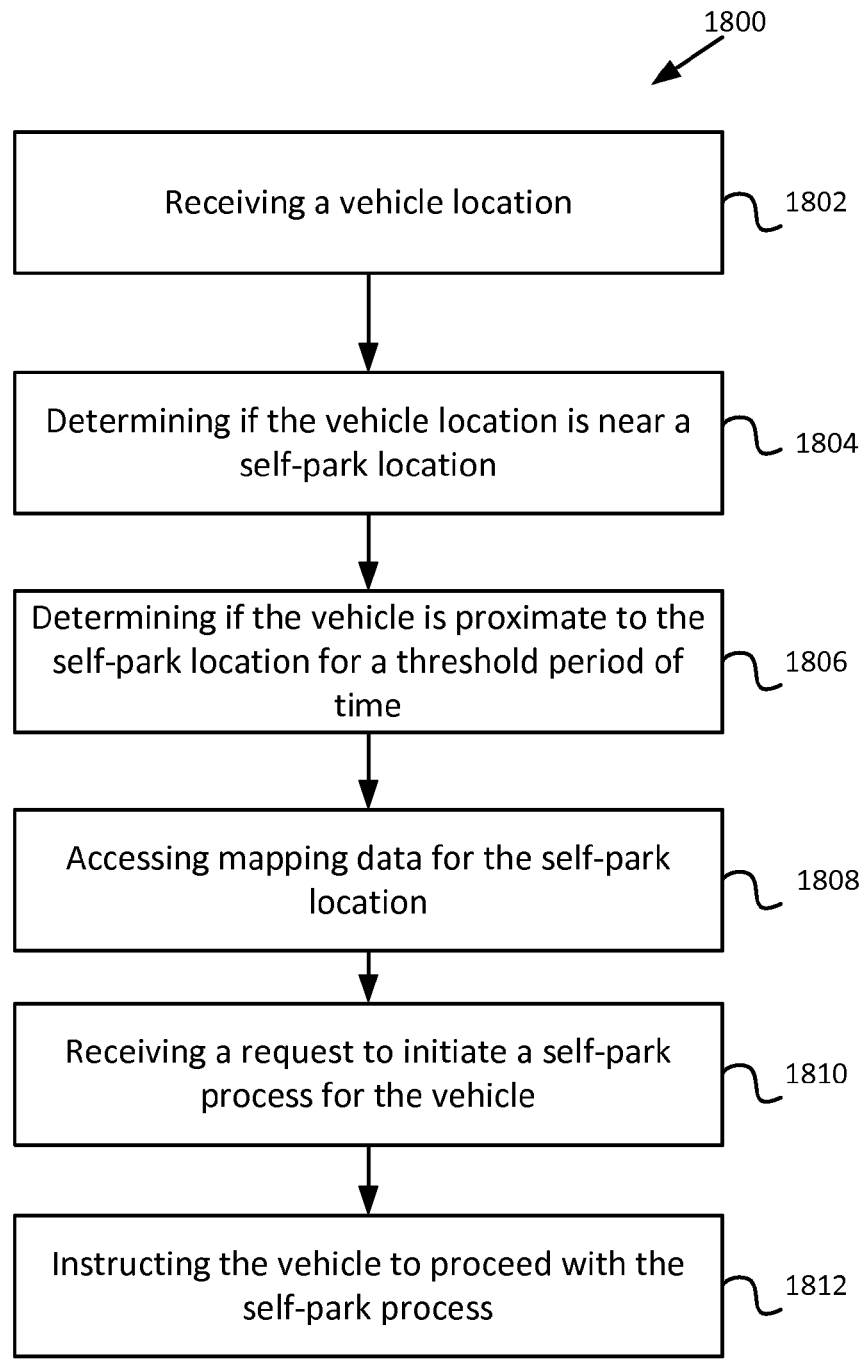
FIG. 18 illustrates a flowchart diagram of a method, in accordance with one embodiment.

FIG. 18 illustrates a flowchart diagram of a method 1800, in accordance with one embodiment. As shown, the method includes receiving a vehicle location 1802. Once the vehicle location is received, the method moves to operation 1804, wherein a determination is made if the vehicle is near a self-park location. In operation 1806, it is determined if the vehicle is proximate to the self-park location for a threshold period of time. The threshold period of time is indicative of the vehicle desiring to enter the self-park location. In operation 1808, mapping data is access for the self-park location. In operation 1810, a request is received to initiate a self-park process for the vehicle. In operation 1812, the method includes instructing the vehicle to proceed with the self-park process. The self-park process acts to enable the vehicle to automatically move from a current location to a destination location within the self-park location. The current location and the destination location are updated dynamically as the current location of the vehicle changes and based on conditions of the destination location.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description.

The invention claimed is:

1. A method for navigating a vehicle automatically from a current location to a destination location without a human operator, the method comprising:

receiving a vehicle location using global positioning system (GPS) data regarding the vehicle;

determining if the vehicle location is near a self-park location using GPS data of the self-park location;

determining if the vehicle is proximate the self-park location for a threshold period of time that is indicative of the vehicle desiring to enter the self-park location;

accessing mapping data defined for the self-park location after the threshold period of time, the mapping data identifying a path within the self-park location and coordinates of at least one physical structure within the self-park location to avoid a collision of the vehicle with the at least one physical structure when the vehicle is automatically moved within the self-park location, wherein the mapping data is made accessible to electronics of the vehicle so that when the vehicle is automatically moved collision with the at least one physical structure is avoided;

receiving a request to initiate a self-park process for the vehicle; and instructing the electronics of the vehicle to proceed with the self-park process, the self-park process acting to instruct the vehicle to automatically move from the current location to the destination location within the self-park location, for the self-park process the electronics use as input at least part of the mapping data and sensor data of at least one vehicle sensor, the electronics are configured to process instructions for drive control of the vehicle while the vehicle is automatically moved at the self-park location, the current location and the destination location being updated dynamically as the current location of the vehicle changes and based on conditions of the destination location, the destination location being a parking location for the vehicle, the method being executed by a processor.

2. The method of claim 1, wherein the self-park location includes a plurality of sensors, each of the sensors being associated to physical locations in the self-park location, and selected ones of the sensors monitoring a volume of space to detect changes.

3. The method of claim 2, wherein the changes in the volume of space include presence or lack of presence of objects in the volume space over time.

4. The method of claim 3, wherein the objects present in the volume of space include one of humans, pets, vehicles, or objects determined to be other than free space for the vehicle to move, park or traverse.

5. The method of claim 2, wherein the sensors of the self-park location include sensors of one or more vehicles located in the self-park location.

6. A method for navigating a vehicle automatically from a current location to a destination location without a human operator controlling primary navigation of the vehicle, the method comprising:

identifying a vehicle location using global positioning system (GPS) data regarding the vehicle;

determining if the vehicle location is near a self-park location using GPS data of the self-park location;

accessing mapping data defined for the self-park location after determining that the vehicle is near the self-park location, the mapping data identifying a path within the self-park location and coordinates of at least one physical structure within the self-park location to avoid a collision of the vehicle with the at least one physical structure when automatically moved within the self-park location, wherein the mapping data is made accessible to electronics of the vehicle so that when the vehicle is automatically moved collision with the at least one physical structure is avoided;

receiving a request to initiate a self-park process for the vehicle; and forwarding instructions to the vehicle to enable the electronics of the vehicle to proceed with the self-park process, the self-park process acting to control the vehicle to automatically move from the current location to the destination location in the self-park location, the current location and the destination location being updated dynamically as the current location of the vehicle changes and based on conditions of the destination location;

wherein the self-park location includes a plurality of sensors, each of the sensors being associated to physical locations in the self-park location, and selected ones of the sensors monitor a volume or area of parking spots to detect changes and avoid collisions, and the sensors identifying when particular ones of the parking spots in the self-park location are available for use, and the availability for use is updated from time to time to identify parking spots that become occupied or become available, wherein said changes are forwarded as an input to the electronics of the vehicle for the self-park process;

wherein the GPS data regarding the vehicle and the GPS data of the self-park location is used to process one or more instructions for drive control of the vehicle while the vehicle is automatically moved at the self-park location;

wherein the electronics of the vehicle include hardware and software on-board the vehicle and the electronics of the vehicle communicate with a server to exchange data to manage at least part of the self-park process for the automatic movement of the vehicle.

7. The method of claim 6, wherein the self-park location is one of a parking garage, a parking lot, a private property area, a garage and drive-way, a private residence, a public location, or a combination of private and public spaces.

8. The method of claim 6, wherein the instructions to proceed with the self-park process is initiated via a remote computing device, and the remote computing device is a computing device that is either portable or not portable and the remote computing device has access to the Internet to communicate with the server and the electronics of the vehicle, the electronics of the vehicle enabling wireless communication via one or more of a peer-to-peer communication, or Wi-Fi communication, or a near field communication (NFC), or a Bluetooth communication.

* * * * *